United States Patent
Chu et al.

(10) Patent No.: US 11,307,910 B2
(45) Date of Patent: Apr. 19, 2022

(54) NOTIFICATION TAGGING FOR A WORKSPACE OR APPLICATION

(71) Applicant: Citrix Systems, Inc., Fort Lauderdale, FL (US)

(72) Inventors: Xiaolu Chu, Nanjing (CN); Dai Li, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/436,372

(22) Filed: Jun. 10, 2019

(65) Prior Publication Data

US 2020/0387411 A1 Dec. 10, 2020

(51) Int. Cl.
*G06F 9/54* (2006.01)
*G06F 16/58* (2019.01)
*H04L 51/224* (2022.01)

(52) U.S. Cl.
CPC .......... *G06F 9/542* (2013.01); *G06F 16/5866* (2019.01); *H04L 51/24* (2013.01)

(58) Field of Classification Search
CPC ............. G06F 21/6245; G06F 21/6254; G06F 21/6263; G06F 2221/032; G06F 2221/2111; G06F 9/54
See application file for complete search history.

(56) References Cited

U.S. PATENT DOCUMENTS

| | | | |
|---|---|---|---|
| 7,437,765 B2 * | 10/2008 | Elms | G06F 21/83 345/615 |
| 9,536,073 B2 | 1/2017 | Thomas | |
| 9,923,923 B1 | 3/2018 | Sharifi Mehr et al. | |
| 10,198,594 B2 | 2/2019 | Zhang et al. | |
| 10,296,762 B2 | 5/2019 | Shimizu | |
| 10,299,304 B1 | 5/2019 | Hintermeister et al. | |
| 10,467,551 B2 | 11/2019 | Gayton et al. | |
| 10,630,630 B1 * | 4/2020 | Khawand | H04M 1/72563 |
| 10,706,173 B2 | 7/2020 | Zhang et al. | |
| 2004/0015729 A1 * | 1/2004 | Elms | G06F 21/83 726/34 |

(Continued)

FOREIGN PATENT DOCUMENTS

WO WO-2017/034746 A1 3/2017

OTHER PUBLICATIONS

International Search Report and Written Opinion for PCT Appl. No. PCT/US2020/012013, dated Mar. 27, 2020.

(Continued)

*Primary Examiner* — Brian W Wathen
(74) *Attorney, Agent, or Firm* — Foley & Lardner LLP

(57) ABSTRACT

Systems and methods described herein provide for management of notifications. A computing device in communication with a client device receives a notification from at least one notification source. The notification may be for rendering on a screen at the client device. A policy engine of the computing device may identify a context of the notification. The policy engine may add a tag to the notification according to the identified context to control rendering of the notification at the client device. The computing device may transmit the notification with the tag to a notification service at the client device. The notification service may be configured to manage the notification at the client device in accordance with the tag.

17 Claims, 6 Drawing Sheets

(56) References Cited

U.S. PATENT DOCUMENTS

| | | | |
|---|---|---|---|
| 2007/0300306 A1* | 12/2007 | Hussain | G06F 21/6227 726/27 |
| 2014/0047461 A1* | 2/2014 | Lee | G06F 9/44521 719/331 |
| 2015/0141066 A1* | 5/2015 | Ramanujam | H04W 4/14 455/466 |
| 2015/0332439 A1* | 11/2015 | Zhang | G06K 9/726 345/647 |
| 2016/0149860 A1* | 5/2016 | Rodniansky | H04L 63/20 726/1 |
| 2017/0063750 A1 | 3/2017 | Vardhan et al. | |
| 2017/0177423 A1 | 6/2017 | Bradley et al. | |
| 2017/0185650 A1 | 6/2017 | Vainas et al. | |
| 2017/0277361 A1* | 9/2017 | Schulze | G06F 3/0484 |
| 2018/0018474 A1* | 1/2018 | Shimizu | G06F 21/6245 |
| 2018/0091465 A1* | 3/2018 | Faaborg | H04W 12/0804 |
| 2018/0288178 A1 | 10/2018 | Gupta | |
| 2018/0359207 A1 | 12/2018 | Chatterjee et al. | |
| 2019/0020687 A1* | 1/2019 | Noon | G06F 16/9535 |
| 2019/0050600 A1* | 2/2019 | Sahoo | G06F 21/6281 |
| 2019/0065777 A1* | 2/2019 | Ravuvari | G06F 21/32 |
| 2019/0109917 A1 | 4/2019 | Milanese et al. | |
| 2019/0250932 A1* | 8/2019 | Valtchev | G06F 3/048 |
| 2019/0266033 A1* | 8/2019 | Sharifi | H04L 51/14 |
| 2020/0028956 A1* | 1/2020 | Adderly | H04M 1/72552 |
| 2020/0036668 A1* | 1/2020 | Bendi | G06F 9/455 |
| 2020/0127960 A1* | 4/2020 | Khawand | H04L 51/12 |
| 2020/0134601 A1* | 4/2020 | Ding | G06Q 20/3224 |

OTHER PUBLICATIONS

International Search Report and Written Opinion on PCT Application No. PCT/US2020/034876, dated Sep. 1, 2020.
Non-Final Office Action on U.S. Appl. No. 16/238,972 dated Mar. 11, 2021.
International Preliminary Report on Patentability on PCT Appl. No. PCT/US2020/012013 dated Jul. 15, 2021.
Notice of Allowance on U.S. Appl. No. 16/238,972, dated Sep. 15, 2021.
International Preliminary Report on Patentability on PCT Appl. No. PCT/US2020/034876 dated Dec. 23, 2021.

* cited by examiner

NOTIFICATION TAGGING FOR A WORKSPACE OR APPLICATION

FIELD OF THE DISCLOSURE

The present application generally relates to computing and client devices, including but not limited to the use of notifications for such devices.

BACKGROUND

Various computing and client devices may receive notifications. Such client devices may receive notifications from a notification source. The notifications may be displayed on such a client device and can include sensitive information.

BRIEF SUMMARY

The present disclosure is directed towards systems and methods for delivery of notifications. The embodiments described herein manage notifications aggregated from multiple notification sources such as native installed applications, virtualized applications, Software as a Service (SaaS) applications, etc. In some respects, the present disclosure is directed towards systems and methods for tagging such notifications. Various applications and other notification sources may be offered to members or users of an organization. Each of the notification sources may generate and deliver notifications to client devices corresponding to the members. The systems and methods described herein may tag notifications from notification sources by introducing a policy-based service framework. Such embodiments may increase user productivity by limiting interruptions and distractions caused by notifications, or by emphasizing certain notifications. Where notifications are tagged as "important," users may be notified of more important notifications which may involve interactive action/feedback from the user. The notifications may be tagged with one or more types of tags, such as visible, readable, unreadable, or invisible tags. The tagged notifications may be delivered to a client device. The client device may include a notification center (also referred to as notification service) having a hook mechanism. The hook mechanism may cause the client device to render the notification on the client device based on the tag.

Enterprises may offer many applications to their employees. During a given workday, an employee may have five or more applications open, executing, or otherwise running on their client device simultaneously. Such applications may cause interruptions or otherwise overwhelm employees by inundating the employees with notifications. Rather than ceasing notifications, it may be beneficial to selectively render various information from notifications. For instance, notifications save time by introducing shortcuts or other selections of information rather than causing the user to switch application. Nonetheless, notifications can also interrupt end users.

According to the present solution, the present disclosure is directed to systems and methods for managing delivery of notifications to a client device. A server in communication with a client device may receive a notification from at least one notification source. The notification may be for rendering on a screen of the client device. A policy engine of the server may identify a context of the notification. The policy engine may apply a tag to the notification based on the context of the notification. The server may deliver the notification including the tag to a notification service of the client device. The notification service may manage the notification at the client device in accordance with the tag.

Rather than disrupting employees, the present technical solution adds tags to notifications based on an identified context for the notification. The notification service may then manage the notification at the client device in accordance with the tag. For instance, the notification service may selectively render the notification, modify and render the notification, and so forth based on the tag. Such implementations may limit disruption to users (e.g., employees) by limiting the number of notifications displayed to a user. In some implementations, the tag may correspond to an urgent notification. The notification service may render the notification in accordance with the tag to draw an employee's attention to the notification. The present technical solution may therefore focus an employee's attention on urgent matters while limiting disruptions caused by less urgent (or distracting) notifications, thus increasing an employee's efficiency and effectiveness.

In one aspect, this disclosure is directed to a method for managing notifications. The method includes receiving, by a server in communication with a client device, a notification from at least one notification source, the notification for rendering on a screen at the client device. The method includes identifying, by a policy engine of the server, a context of the notification. The method includes adding, by the policy engine according to the identified context, a tag to the notification to control rendering of the notification at the client device. The method includes transmitting, by the server to a notification service at the client device, the notification with the tag. The notification service is configured to manage the notification at the client device in accordance with the tag.

In some embodiments, identifying the context of the notification includes identifying at least one of: a source of the notification, time information, a location of the client device, information about an application to receive the notification, information about a network connection of the client device, or information about a user of the client device. In some embodiments, the method further includes identifying, to the notification service via the tag, an application of the client device. In some embodiments, adding the tag to the notification comprises modifying at least a portion of the notification. In some embodiments, the method further includes determining, by the policy engine according to the context of the notification, to add the tag to the notification as a visible or an invisible tag. In some embodiments, the method further includes causing, in accordance with the invisible tag, at least some text in the notification to be obfuscated to a user of the client device when rendered on the screen at the client device.

In some embodiments, the method further includes causing the notification service to monitor for an action of a user of the client device in response to the notification service rendering the notification at the client device. In some embodiments, the method further includes causing the notification service to render the notification, and to transmit a message to an application of the client device in accordance with the tag. In some embodiments, the notification service includes a hook (sometimes referred to as a hook mechanism) comprising code executable on the client device. The hook may be configured to transmit the message to the application of the client device. In some embodiments, the message is configured to cause the application to monitor for an action from a user of the client device responsive to the rendered notification, and to transmit a second notification to the notification service to render on the screen in response to the absence of the action from the user within a predetermined duration.

In another aspect, this disclosure is directed to a method. The method includes receiving, by a server in communication with a client device, a notification from at least one notification source. The method includes identifying, by the server, a context of the received notification. The context may be indicative of a priority for display of the received notification on the client device. The method includes adding, by the server, a tag to the notification to control display of the received notification on the client device. The tag may be configured to indicate to the client device the priority for display of the received notification based on the identified context. The method includes providing, by the server, the notification with the tag to the client device to establish a workflow for notifications received at the client device. The workflow may prioritize display of the received notifications at the client device based on the context indicated by tags of the received notifications.

In some embodiments, identifying the context of the notification includes identifying at least one of: a source of the notification, time information, a location of the client device, information about an application to receive the notification, information about a network connection of the client device, or information about a user of the client device. In some embodiments, the notification is a first notification from a first notification source and the priority is a first priority. The method may further include receiving, by the server, a second notification from a second notification source. The method may further include identifying, by the server, a context of the second notification indicative of a second priority for display of the second notification on the client device. The method may further include adding a tag to the second notification to control display of the first notification and the second notification in accordance with the first priority and the second priority.

In some embodiments, the first priority is a higher priority than the second priority. Providing the notification may include providing, by the server, the first notification with the tag indicating the first priority to the client device. Providing the notification may further include receiving, from the client device, an indication indicating to display the first notification. Providing the notification may further include providing, by the server responsive to receiving the indication, the second notification with the tag indicating the second priority to the client device. In some embodiments, providing the notification may include providing, by the server, the first notification with the tag indicating the first priority and the second notification with the second tag indicating the second priority to the client device to establish the workflow for notifications received at the client device. The workflow may prioritize display of the first notification relative to the second notification at the client device based on the first priority and the second priority indicated by the tags of the respective first and second notifications. In some embodiments, the method further includes determining, by the policy engine according to the context of the notification, to add the tag to the notification as a visible or an invisible tag. In some embodiments, the method further includes causing, in accordance with the invisible tag, at least some text in the notification to be obfuscated to a user of the client device when rendered on the screen at the client device.

In another aspect, this disclosure is directed to a server for managing notifications. The server includes at least one processor configured to receive a notification from at least one notification source, the notification for rendering on a screen at a client device. The at least one processor is further configured to identify a context of the notification. The at least one processor is further configured to add, according to the identified context, a tag to the notification to control rendering of the notification at the client device. The at least one processor is further configured to transmit, to a notification service at the client device, the notification with the tag. The notification service may be configured to manage the notification at the client device in accordance with the tag.

In some embodiments, the at least one processor is configured to identify the context of the notification by identifying at least one of: a source of the notification, time information, a location of the client device, information about an application to receive the notification, information about a network connection of the client device, or information about a user of the client device. In some embodiments, the at least one processor is configured to identify to the notification service via the tag, an application of the client device. In some embodiments, the at least one processor is further configured to determine, according to the context of the notification, to add the tag to the notification as a visible or an invisible tag. In some embodiments, the at least one processor is further configured to cause, in accordance with the invisible tag, at least some text in the notification to be obfuscated to a user of the client device when rendered on the screen at the client device.

In some embodiments, the at least one processor is further configured to cause the notification service to monitor for an action of a user of the client device in response to the notification service rendering the notification at the client device. In some embodiments, the at least one processor is further configured to cause the notification service to render the notification, and to transmit a message to an application of the client device in accordance with the tag. In some embodiments, the message is configured to cause the application to monitor for an action from a user of the client device responsive to the rendered notification, and to transmit a second notification to the notification service to render on the screen in response to the absence of the action from the user within a predetermined duration.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
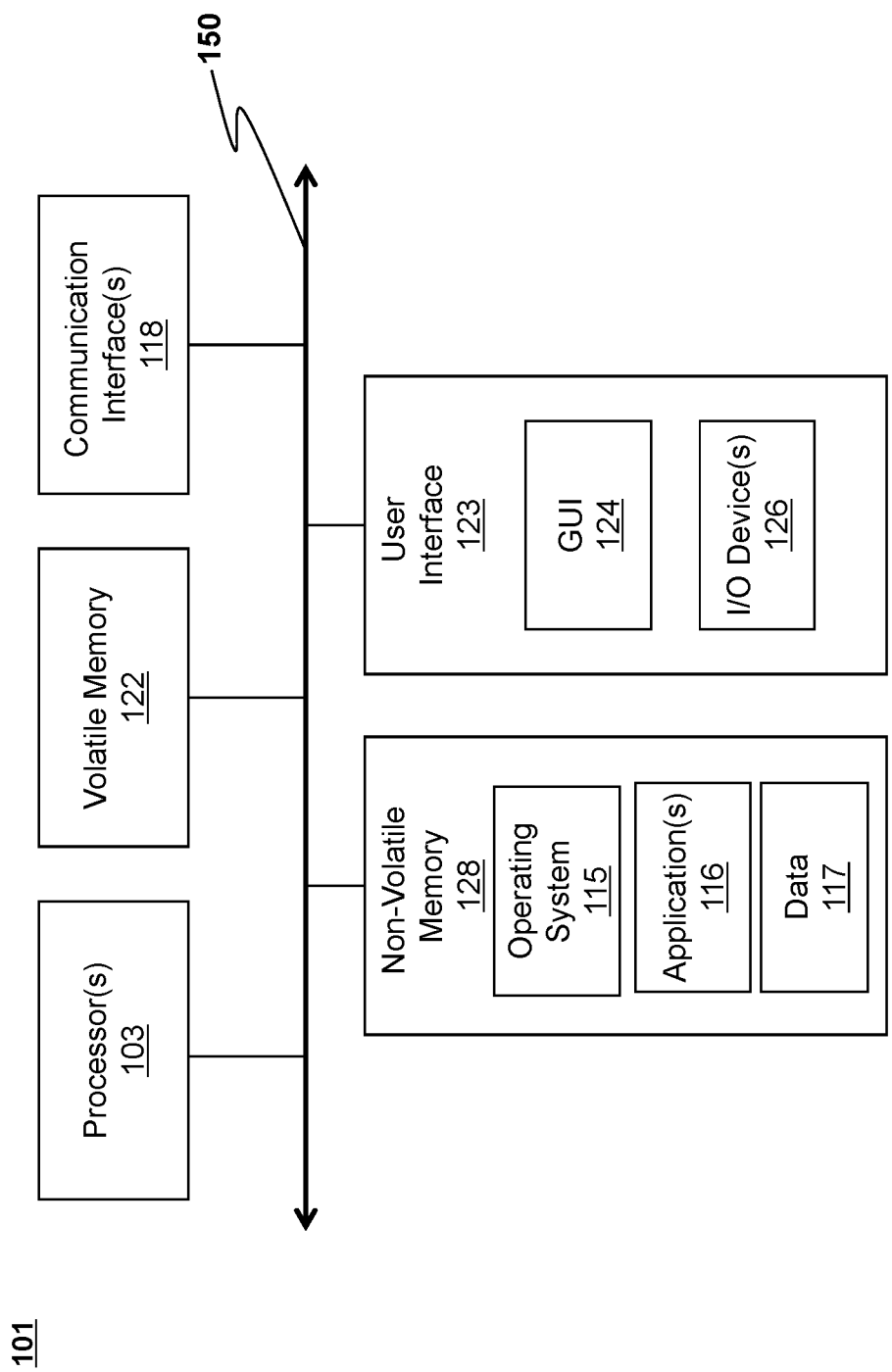
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for delivery of notifications.

Section C describes systems and methods for tagging notifications.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for Delivery of Notifications

The present disclosure is directed towards systems and methods for delivery of notifications. The embodiments described herein protect notifications aggregated from multiple sources such as native installed applications, virtualized applications, Software as a Service (SaaS) applications, etc. The embodiments described herein can delivery notifications by introducing a policy-based service framework (also sometimes referred to herein as a policy engine). The policy engine may be configured to enable, disable, rewrite or otherwise modify notifications in various context-based scenarios. Such embodiments may protect and secure user devices and/or workspaces from inadvertently exposing information to unintended recipients.

Many mobile device (or other client device) vendors are providing features for protecting device security and implementing data loss prevention (DLP) strategies. Some mobile devices include features, such as facial recognition systems or other biometric detection systems for unlocking the user's client device (and even, in some implementations, using applications and features within the client device) to prevent unauthorized use of the client device. On the other hand, some application and device vendors leverage notifications for informing end users of information in real time. To this end, some client devices may render (e.g., display or present) notifications even while the client device is in a locked screen mode (e.g., with the assumption that a user that is with or near the client device can be alerted or notified via the notifications). As a result, security and/or privacy issues are introduced because notifications may be rendered while a user is away from their client device and the device may be located in a public or otherwise non-private environment. The notifications may include sensitive information and private data such as, for instance, chat conversations, incoming email senders and email bodies, meeting requests, rendezvous locations, and so forth. As one example, some enterprise proprietary or otherwise private information may be pushed to a client device. Where the user is away from their client device, the information may be inadvertently disclosed to others outside and/or not affiliated with the enterprise (e.g., to an untrusted recipient) rather than remaining internal to the organization.

On one hand, while users are away from their client devices, applications may continue to display notifications received either via a cloud notification push service or via an application background refresh (e.g., set within pre-configured settings for the client device). As such, privacy of such notifications may be compromised through inadvertent leaking of information to others while the notifications are rendered on the device while a person is away from their device. To address privacy concerns, a user may disable notification settings on their client devices. However, such actions may negatively impact the utility and benefits of notifications, as well as user friendliness, as most users are accustomed to receiving notifications (e.g., of incoming text or email messages, or application updates on their mobile devices).

The present disclosure presents solutions over currently implemented systems and methods by selectively rendering, modifying, or blocking/disabling notifications rendered on a client device based on a determinable or estimated location of a user of the client device, and/or a state of the client device for instance. The systems and methods described herein can provide a policy-based notification protection framework to secure precise or detailed notification information, or limit the amount of such information being exposed inadvertently. The systems and methods can employ a policy engine for identifying information in a notification and various protection techniques. The policy engine can determine and assign a protection level (sometimes referred to as a risk level) to various notifications, e.g., based on contextual information indicative of whether an authorized user is proximate to the receiving client device, the state of the client device, the content of the notification and so on, which may be indicative of whether a security or privacy issue can arise in allowing part or all of the notification to be rendered. The policy engine may rewrite, remove or modify content or information within the notification, (e.g., according to the assigned protection level) thus eliminating the likelihood of inadvertent disclosure of sensitive information within a notification. The policy engine may use various factors for determining whether to display or render notifications, modify a notification's content, or block a notification all together. Such factors may include, for instance, geographic information (e.g., global positioning system (GPS) or similar data), idle state or other condition of the client device (e.g., including temporal information indicative of prolonged inactivity or separation from an authorized user), use of a reputable Wi-Fi network for communicating the notification, and so forth. Hence, privacy and security is enhanced and improved relative to existing systems (e.g., clients receiving direct notification pushes from notification sources) that do not manage notifications much less employ policy-based contextual considerations for managing notifications.

Figure 2:
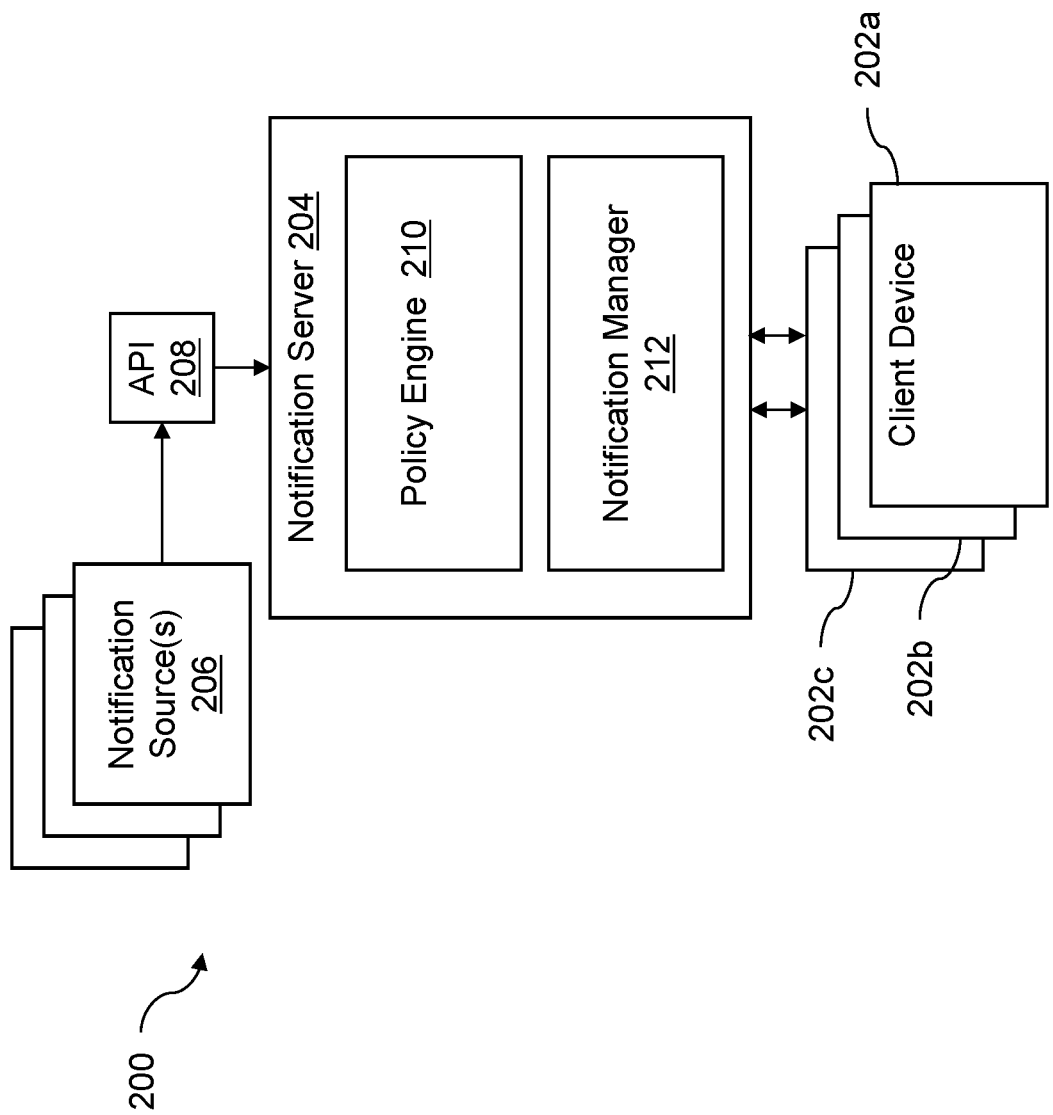
FIG. 2 is a block diagram of an example embodiment of a system for managing delivery of notifications.

Referring now to FIG. 2, depicted is a block diagram of a system 200 for managing notifications, according to an illustrative embodiment. The system 200 is shown to include a plurality of client devices 202, a notification server 204, and a plurality of notification sources 206. The notification sources 206 (e.g., Microsoft® Outlook or other email service, document sharing and storage applications such as Dropbox®, Google Drive®), social media servers/services) may deliver notifications to the notification server 204 (e.g., through at least one API 208). A policy engine 210 of the notification server 204 may be configured to receive information indicative of a physical or geographical proximity between a client device 202 and an authorized user (e.g., owner or assigned user) of the client device 202. The policy engine 210 may be configured to receive additional information that is contextual and associated with the client device (and/or its application(s)), its network and/or the authorized user, such as idle state information corresponding to the client device 202 (or an application executing on the client device 202). Idle state information (sometimes referred to as user activity information or active use information) may be or include information or data corresponding to whether or not a user is using (e.g., actively or otherwise) and/or has used (or not used) the client device 202 (or an application of the client device 202), e.g., in association with any time period, window, frequency and/or activity pattern. The policy engine 210 may be configured to determine a notification protection level based on the information received and/or evaluated by the policy engine 210. The notification protection level may be indicative of risks (e.g., privacy and/or security risks) associated with rendering a notification on a client device, and/or an amount of effort or processing that can or should be applied to address the risks. The notification protection level can for instance be a numerical representation of the proximity of the authorized user to a client device 202, the idle state information corresponding to the client device 202 (or an application executing on the client device 202), and/or the contextual information corresponding to the client device 202, its network, its user and/or its application(s).

A notification manager 212 of the notification server 204 may be configured to receive a notification from one of the notification sources 206 for rendering on (at least) a screen or other interface (e.g., speaker or other output/communication/feedback system) of the client device 202. The notification manager 212 may be configured to allow, modify, or block the received notification according to the determined notification protection level.

The systems and methods of the present solution may be implemented in any type and form of device, including clients, servers and/or appliances described above with reference to FIG. 1. As referenced herein, a "server" may sometimes refer to any device in a client-server relationship, e.g., the notification server 204 in a handshake with the client device(s) 202 and/or the notification source(s) 206. The client device(s) 202, notification server 204, and/or notification source(s) 206 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

The system 200 is shown to include a plurality of client devices 202 including a first client device 202a, a second client device 202b, a third client device 202c, and so forth (sometimes referred to as client device(s) 202). While three client devices 202a-202c are shown, the system 200 may include any number of client devices 202. Hence, the present disclosure is not limited to the particular arrangement depicted in FIG. 2. The client device(s) 202 may be or include aspects, features, and components similar to the computing device 101 described above. The client device(s)

202 may be or include, for instance, a desktop computer, a laptop computer, a smart phone or mobile device, a tablet, to name a few possibilities. The client device(s) 202 may host, execute, deliver, or otherwise provide applications or resources to a user. For instance, the client device(s) 202 may include a display or screen which renders a user interface including various icons for selecting applications. A user may select an icon and launch the corresponding application (which may be configured to execute on a cloud-based server with the server delivering or streaming content to the client device 202 or the application may be configured to execute natively on the client device 202). In some embodiments, the client device(s) 202 may be configured to render (e.g., display, stream, play, in visible and/or audible form or otherwise) notifications from the various applications and sources (such as notification sources 206) on the screen/interface of the client device 202. In some embodiments, one of the client devices 202 may be different from other client devices 202. For instance, the first client device 202a may be or include a desktop computer, and the second client device 202b may be or include a mobile device. The first and second client devices 202a, 202b may both be associated with or correspond to an authorized user. The client devices 202a-202c may be referred to hereinafter generally as "client device 202" or "client device(s) 202." It should be understood that at least one of the client device(s) 202 may be configured according to the description below. In some implementations, each of the client devices 202 may be configured according to the description below.

The client device(s) 202 may be configured to monitor, evaluate, provide and/or determine various state or condition information (e.g., idle state information) corresponding to the client device(s) 202. One or more monitoring systems, such as or including an agent (e.g., residing or executing on the client device 202) and/or end-point detection system (e.g., residing on server(s) and/or the client device 202) may detect, identify, monitor, track, determine and/or provide any such information. In some embodiments, idle state information (sometimes referred to as user activity information or active use information) may be or include information or data corresponding to whether or not a user is using (e.g., actively or otherwise) and/or has used (or not used) the client device 202 (or an application of the client device 202), e.g., in association with any time period, window, frequency and/or activity pattern. The client device 202 may be configured to identify, determine, generate, etc., the idle state information based on, for instance, an elapsed duration between inputs received from the user, a duration in which the client device 202 is turned off or in "sleep mode," or has not received user input or detected movement, and so forth. The client device 202 may be configured to generate idle state information based on such data corresponding to user inputs to the client device 202, or the user's use or interactions with the client device 202 (or its application(s)). In some embodiments, the client devices 202 may be configured to perform various functions responsive to generation of the idle state information. Idle state information may be indicative of the client device 202 being in an idle state (e.g., an extended duration of non-use), or that the client device 202 has (e.g., automatically) turn off or darken the screen of the client device 202. While described above as the client device 202 being in an idle state (e.g., low power, power-saving or sleep mode), in some embodiments, the client device 202 in such a state may be configured to detect an idle state of an application executing on the client device 202.

In some embodiments, the client device 202 may be configured to monitor contextual information of the client device 202. "Contextual information," as used herein, can refer to data corresponding to a condition, state, operation mode and/or status of the client device 202 and/or an application which is accessed via the client device 202. As some non-limiting examples, the client device 202 may be configured to monitor a duration of the client device 202 being in a stationary/static state (e.g., based on GPS data remaining unchanged, gyroscope sensors showing limited to no movement), duration of the screen being in a darkened or low-power state, duration of the client device 202 being in a locked state (e.g., calculating how long the device screen is darkened or in a low-power state or locked, using a clock/timer), whether the screen is covered by an accessory cover (e.g., using one or more camera sensors or ranging sensors positioned in or near the client device 202), duration since the client device 202 was last unlocked (e.g., using a clock/timer), battery level of the client device 202 (e.g., remaining battery, percentage full/depleted, or estimated remaining duration of operation), reputation of the application (e.g., according to a rating from an application store, from internet reviews, and so forth), category of the application (e.g., based on data from an application store, its developer, its features, or internet reviews), time or day of the notification (e.g., whether the notification is received when the application or client device 202 is in use, during business hours or otherwise, according to data from a user's calendar, etc.), positioning-related information of the client device 202 (e.g., from GPS data or Wi-Fi positioning), whether the client device 202 is in a trusted zone (e.g., based on the location of the client device 202, a network connection for the client device 202, a GeoFence, and so forth), or a Wi-Fi network of the client device 202 (e.g., based on the Wi-Fi name and type, Wi-Fi reputation, Wi-Fi signal strength, Wi-Fi encryption level, Wi-Fi authentication method, Wi-Fi related security settings, etc.). The client device 202 may be configured to generate data corresponding to such monitored conditions, states, operating modes and statuses, which may be or correspond to the contextual information. Contextual information can include miscellaneous or supporting information that can be independent of or related to idle state information for instance. As an example, contextual information (e.g., the "duration" of being in low power mode) can supplement idle state information (e.g., being in low power mode).

The client device(s) 202 and/or the monitoring system(s) may be configured to deliver various information and data to the notification server 204. The client device(s) 202 and/or the monitoring system(s) may be configured to deliver, for instance, the idle state information and contextual information to the notification server 204. The client device(s) 202, the monitoring system(s) and/or notification server 204 may be communicably coupled to one another such that they can transmit and/or receive information amongst one another. The client device(s) 202, the monitoring system(s) and/or notification server may be communicably coupled to one another via a network. In some embodiments, the network may be a local area network (LAN), wide area network (WAN), wireless local area network (WLAN), virtual private network (VPN), etc. The client device(s) 202, the monitoring system(s) and/or notification server 204 may be configured to exchange data with one another across such a network.

The notification server 204 may be configured to receive data and information (e.g., contextual information, idle state information) from various sources and locations. The notification server 204 may be configured to receive data from the monitoring system(s), the client device(s) 202 and/or from the notification source(s) 206. The notification server 204 may be configured to intercept, detect, receive, convey, route, process and/or manage notifications from the notification source(s) 206, and the notification server 204 may be configured to receive various information (such as idle state information, contextual information, etc.) from the monitoring system(s) and/or the client device(s) 202. The notification server 204 may be configured to use such information to detect, identify, compute, calculate, or otherwise determine a notification protection level based on, at least, the information from the monitoring system(s) and/or the client device(s) 202. The notification server 204 may be configured to selectively allow, modify, or block notifications from the notification source(s) 206 based on the determined notification protection level, as described in greater detail below.

The notification server 204 is shown to include a policy engine 210 by way of example, although the policy engine 210 may be external to the notification server 204 in some embodiments for instance. The policy engine 210 may be any device(s) or component(s) designed or implemented to apply at least one policy to data and information received from various sources. Generally speaking, the policy engine 210 may be configured to receive information indicative of a proximity between a client device 202 and an authorized user of the client device 202. The policy engine 210 may be configured to receive idle state information corresponding to the client device 202 and/or an application executing on the client device 202. The policy engine 210 may be configured to determine a notification protection level using such information. While shown as embodied on the notification server 204, in some implementations, the policy engine 210 (and/or the notification manager 212) may be communicably coupled to the notification server 204, remotely accessible by the notification server 204, etc. Hence, the present disclosure is not limited to the particular arrangement shown in FIG. 2.

The policy engine 210 may be configured to identify, retrieve, collect, access, aggregate or otherwise receive information corresponding to or indicative of a proximity between a client device 202 and an authorized user of the client device 202. The authorized user may be a user who can be logged (e.g., successfully) onto the client device 202, a user who is registered with and/or owns the client device 202, a user who has permission to permanently or temporarily use the device 202, and so forth. The policy engine 210 may be configured to receive information indicative of the proximity between the client device 202 and authorized user, by identifying a location of the client device 202 and identifying or estimating a location of the authorized user.

The policy engine 210 and/or a monitoring system may be configured to identify or determine the location of the client device 202. The policy engine 210 and/or a monitoring system may be configured to identify the location of the client device 202 by receiving GPS or other location data (e.g., network connection data, such as IP address, Wi-Fi network info and/or port connection info) corresponding to the client device 202. In some embodiments, the client device 202 and/or a monitoring system may deliver the GPS/location data to the policy engine 210 in various intervals, dynamically or when the location of the client device 202 changes, continuously (or near continuously), etc. The policy engine 210 may be configured to determine the location of the client device 202 based on the location data received from the client device 202. In some embodiments, the policy engine 210 may be configured to determine the location of the client device 202 based on the location of an access point via which the client device 202 accesses a network. Where the client device 202 accesses a network, the client device 202 may use or form a connection with an access point, which may be used for identifying a position of the client device 202 (e.g., based on which network device the client device 202 connects to, through handshake data during initial access negotiation, physical port connection, Wi-Fi hotspot connection, and so forth).

The policy engine 210 may be configured to identify, determine, retrieve, or otherwise receive information or data corresponding to a location of the authorized user. The policy engine 210 and/or a monitoring system may be configured to estimate the authorized user's location in a number of ways. As one non-limiting example, the policy engine 210 may be configured to receive information or data corresponding to a local area network (LAN), enterprise private network (EPN), or other enterprise network which the user may access (e.g., using another client device). The policy engine 210 may be configured to identify a source network internet protocol (IP) address (e.g., associated with a device in use by the authorized user). The policy engine 210 and/or the monitoring system may be configured to determine whether the user is located within the enterprise based on whether an IP address for the device in use by the user is accessing the enterprise network. As another example, the policy engine 210 may be configured to determine which of several possible client devices 202 the user is accessing by receiving data corresponding to an indication of the client device 202 that the user is currently or most-recently accessing. For instance, where the user logs into a first client device 202a and, subsequently, logs into a second client device 202b or endpoint device (different from the first client device 202a), the policy engine 210 may be configured to determine (e.g., via an IP address of the most recent login from the second client device 202b, which is different from an IP address of the earlier login from the first client device 202a) that the user is no longer located near the first client device 202a. As yet another example, where the user accesses (e.g., on a client device 202) a mobile application associated with and/or managed by the enterprise, the policy server 210 and/or the monitoring system may be configured to generate a prompt (e.g. a request directed or transmitted to a known IP address of the client device 202, to request for a response providing a GPS location of the client device 202) which causes the client device 202 which the user is accessing to transmit a current location of the client device 202. As still another example, where the user accesses a virtualized application or desktop, the user may make the request, register, authenticate and/or sign in at a network/IP address (such as ab address of a personal computer, tablet, thin client, and so forth) indicative of the user's location. The user's location may be identified when the user reports, checks-in, signs-in, registers, authenticates, make a transaction/payment, and so on, at a device (e.g., security gateway or entryway, transaction terminal, networked node). Hence, the policy engine 210 may obtain location information of the user even where the user accesses a virtualized application or desktop e.g., using a device other than the first client device 202a. While these examples are provided, it should be understood that the present disclosure is not limited to these particular examples. A person's location may be identified or inferred through any number of different methods, manners, means, etc. Hence, the examples provided above are merely illustrative in nature.

The policy engine 210 may be configured to determine a proximity of the client device 202 and the authorized user of the client device 202. The policy engine 210 may be configured to compare the determined location of a first client device 202a (e.g., based on the location data from the client device 202a, data corresponding to an access point for the client device 202a) to the estimated, identified, inferred, etc., location of the authorized user (for instance, based on the determined location of a second client device 202b, which may be a mobile device of the authorized user)). The policy engine 210 may be configured to determine whether the authorized user is in possession, in close proximity, near, in the same room, etc., as the client device 202a (for receiving a notification) based on the comparison and relative locations. For instance, the policy engine 210 may compare the locations or relative locations with site maps and/or predetermined separation/distance threshold(s) (e.g., that are indicative of the user being in possession, or in the same room, etc.). Such thresholds can be set at specific distances (e.g., 1 meter, 5 meters, and so on). The locations of the user (based on the location of the second client device 202b) and the client device 202a can be mapped or translated onto locations within a site map, and compared with boundaries of rooms or partitions described in the site map.

The policy engine 210 may be configured to receive data and/or information corresponding to an idle state of the client device 202a and/or an application executing on the client device 202a. An idle state can be indicative of the activity level and/or idleness of the client device 202a (or its application), and can be a value (e.g., a numerical value, ranging from 1 to 10 for instance) or a state, condition or mode (e.g., low power or power-saving mode, active or awake mode). As described above, the client device 202a (e.g., assigned to or otherwise associated with the authorized user) and/or a monitoring system may determine, communicate, deliver, provide or otherwise transmit idle state information to the notification server 204 (e.g., via the network connecting the client device 202a, monitoring system and/or notification server 204). The notification server 204 may be configured to receive the idle state information from the client device 202 and/or the monitoring system. In some examples, the idle state information may indicate that the client device 202a (or application executing on the client device 202a) is idle (e.g., not actively being used by a user, or in locked state, low/reduced power state, or in sleep mode). In some examples, the idle state information received from the client device 202a may indicate that the client device 202a (or application executing on the client device 202a) are being actively or recently used, controlled, operated, etc., by the user, or otherwise.

The policy engine 210 may be configured to receive contextual information corresponding to the client device 202a. Similar to the idle state information, the client device 202a and/or the monitoring system may be configured to transmit the contextual information to the notification sever 204 via the network which connects the client device 202a, the monitoring system and/or notification server 204. The notification server 204 may receive the contextual information in any form or manner, e.g., periodically, responsive to sending a request for the information, continuously, or dynamically as new/update information is available.

The policy engine 210 may be configured to calculate, compute, identify, generate, or otherwise determine a notification protection level. The notification protection level may correspond to, or be generated for the client device 202a which transmits the idle state information. Where a particular user is an authorized user for a plurality of client devices (e.g., client device 202a, client device 202b, client device 202c, and so forth), the policy engine 210 may be configured to determine a notification protection level for each of the client devices 202.

The policy engine 210 may be configured to determine the notification protection level by performing an operation or applying a function on, for instance, 1) the proximity information corresponding to the relative distance of the authorized user and client device 202a (e.g., a numerical value of the relative distance), and 2) the idle state information and/or contextual information (e.g., in numerical representations or otherwise). The policy engine 210 may compute numerical representations of the idle state information and/or contextual information by assigning an integer (or other number or value) to particular responses or information from the idle state information or contextual information. In some embodiments, the policy engine 210 may be configured to weigh (e.g., apply a weight to) some information differently from other information. For instance, some contextual information may be weighted differently than other contextual information according to the relative importance or relevance of various information. As another example, the idle state information may be weighted differently than one or more types of contextual information. The policy engine 210 may be configured to perform an operation (such as adding, multiplying, dividing, etc.) or mathematical function on the relative distance and numerical representations of the idle state information and/or contextual information. It is noted that the policy engine 210 can apply any combinations and sub-combinations of operations, weighting, numerical representation calculations, etc. on the proximity information, the idle state information and/or one or more types of contextual information, to determine a notification protection level based on the proximity information, idle state information, and/or the contextual information. The policy engine 210 may determine the notification protection level by assigning or determining numerical values to the different types of information (which may be weighted differently), and performing an operation or function on those numerical values to compute the notification protection level. Thus, the notification protection level may be a numerical representation of the proximity of the authorized user to a respective client device 202, the idle state information corresponding to the client device 202 (or an application executing on the client device 202), and/or the contextual information corresponding to the client device 202, its network, its user and/or its application(s).

The policy engine 210 may be configured to maintain, include, store, access, or otherwise use thresholds. The thresholds may be compared against the notification protection level to determine whether to allow, modify or block a corresponding notification to a respective client device 202. In some embodiments, the policy engine 210 may include or access any number of thresholds. Each of the thresholds may correspond to a particular action to perform on incoming notifications destined for a particular client device 202. For instance, the policy engine 210 may be configured to store or access a first threshold and a second threshold. The first threshold may be a threshold which separates instances where a notification is delivered in full to the client device 202 and instances where a notification is modified prior to delivery to the client device 202. The second threshold, in some examples, may be a threshold which separates instances where a notification is modified prior to delivery to the client device 202 and instances where a notification is blocked from delivery to the client device 202. The policy engine 210 may be configured to compare the notification protection level for a client device 202 to the first threshold and second threshold (or ranges defined by the thresholds). As described in greater detail below, the notification manager 212 may be configured to selectively allow, modify, or block notifications (e.g., received or intercepted from notification source(s) 206) based on such comparison by the policy engine 210.

The notification source(s) 206 may be any devices, components, servers, programs, resources, applications, and so forth configured to generate notifications for a client device 202. The notification source(s) 206 may include any application or resource which generates data (including notifications) remotely and delivers such data to the client device 202. In some embodiments, the notification source(s) 206 may be or include a Software-as-a-Service (SaaS) application, a virtual desktop, a virtual application, etc. Various non-limiting examples of such notification source(s) 206 can include, for instance, servers in communication with mobile device applications available on an application store, Microsoft® Outlook or other email service, document sharing and storage applications (such as Dropbox®, Google Drive®), social media servers/services and so forth. Each of such notification source(s) 206 may be designed or implemented to generate notifications (e.g., updates, alerts, reminders, unicasts, broadcasts), and transmit those notifications to the client devices 202.

In some embodiments, the notification source(s) 206 may be configured to deliver the notifications to the client devices 202 through the notification server 204. Hence, the notification source(s) 206 may direct, transmit or route notifications destined for a client device 202 to the notification server 204, and the notification server 204 may selectively route those notifications to the client device 202, as described in greater detail herein.

The notification source(s) 206 may be configured to communicate the notifications to the notification server 204 via one or more application program interfaces (APIs) 208. The API 208 may be any device(s) or component(s) configured to define a language, protocol or format of data between elements. The API 208 may be configured to define a language, protocol or format of data between the notification source(s) 206 and the client device(s) 202 (or particular application(s) operating on the client device(s)). In some embodiments, the system 200 may include a plurality of APIs 208 which are structured according to, for instance, the type of client device 202, the operating system and/or application(s) executing on the client device(s) 202, and so forth. As two non-limiting examples, the system 200 may include Apple Push Notification Service (APNS) for client device(s) 202 which uses the iOS operating system, and Google Cloud Messaging (GCM) for client device(s) 202 which uses an Android® operating system. The APIs 208 may define, at least, the structure of notifications delivered from the notification source(s) 206 to the client device(s) 202 (and routed through the notification server 204). The APIs 208 may push, route or deliver notifications (and/or other data) to the notification server 204 (or that are intercepted by the notification server 204) for delivery to the client device(s) 202.

The notification server 204 is shown to include a notification manager 212 in FIG. 2 for instance. In some embodiments, the notification manager 212 may be part of or combined with the policy engine 210. The notification manager 212 may be designed or implemented to receive notification(s) from the notification source(s) 206 and can perform one or more actions on the notifications based on, for instance, the notification protection level. The notification manager 212 may be configured to allow the notification to be delivered to the client device 202, modify the notification and deliver the modified notification to the client device 202, and/or block the notification from being delivered to the client device 202.

The notification manager 212 of the notification server 204 may be configured to receive notifications from the notification source(s) 206. The notification manager 212 may be configured to receive the notifications prior to transmission, routing, and/or delivery of the notifications to the intended client device 202. In some embodiments, the notification manager 212 may be configured to intercept notifications from the notification source(s) 206. In some embodiments, the notification manager 212 may be configured to receive notifications via the API 208 from the notification source(s) 206. In such embodiments, the notification source(s) 206 may deliver the notifications (which are received by the notification manager 212) to the intended client device 202 via a corresponding API 208 through the notification server 204.

The notification manager 212 may retrieve, receive, or otherwise identify the notification protection level from the policy engine 210 for the particular client device 202 responsive to receiving the notification destined for the particular client device 202. The notification manager 212 may request and/or receive instructions and/or a notification protection level from the policy engine 210 to manage (e.g., allow, modify or block) a corresponding notification destined for the particular client device 202, responsive to receiving the notification. In some embodiments, the policy engine 210 may be configured to receive the proximity information, idle state information, and/or contextual information responsive to the notification manager 212 receiving the notification. In some embodiments, the policy engine 210 may be configured to compute the notification protection level responsive to the notification manager 212 receiving the notification.

The notification manager 212 may be designed or implemented to perform one or more actions on the notifications received from the notification source(s) 206 which are destined for a particular client device 202. The notification manager 212 may be configured to perform the one or more actions based on the notification protection level from the policy engine 210, or based on instructions determined by the policy engine 210 according to the notification protection level. In some embodiments, the notification manager 212 may be configured to perform one or more actions based on the comparison of the notification protection level to the various threshold(s) by the policy engine 210. As such, the notification manager 212 may perform various actions on the received notification according to the determined notification protection level from the policy engine 210.

The notification manager 212 may be configured to perform various actions on the received notification including, but not limited to, allowing the notification to be delivered to the intended client device 202 (e.g., without any change to the content of the notification), modifying the notification (e.g., modification of the content and/or formatting) and delivering the notification to the client device 202, and/or blocking the notification (e.g., from being delivered to the intended client device 202, or by turning off the notification feature on the client device 202). The notification manager 212 may be configured to perform such actions based on the notification protection level.

In some embodiments, the notification manager 212 may be configured to allow the notification to be delivered to the intended client device 202. The notification manager 212 may be configured to allow the notification to be delivered to the intended client device 202 when the notification protection level is determined based on the scenario that the authorized user is, for instance, near the client device 202, the client device 202 is in a safe location, the client device 202 is not idle (or has not been idle for an extended period), and so forth. The notification manager 212 may be configured to allow the notification to be delivered to the intended client device 202 based on the comparison of the notification protection level to the first threshold (described above). For instance, where the notification protection level is less than the first threshold, the notification manager 212 may be configured to allow the notification to be delivered to the intended client device 202. The notification manger 212 may push the notification to the client device 202 for rendering, and the client device 202 may receive and render the notification.

In some embodiments, the notification manager 212 may be configured to modify a notification to be delivered to the intended client device 202. The notification manager 212 may retain or include information or data corresponding to the structure of various notification data transmitted from the notification source(s) 206. Such information may be accessible by the notification manager 212 via the APIs 208. The notification manager 212 may be configured to determine whether a notification is modifiable based on whether the notification manager includes or has access to the structure or format of the notification data. The notification manager 212 may be configured to modify some notifications (where possible), as described in greater detail below. Where the notification manager is not capable of modifying a notification, the notification manager 212 may be configured to, for instance, block the notification from being sent to the client, allow the notification but communicate a signal to the client device 202 to disable a notification preview feature on the client device 202 (so that the notification is not rendered/displayed on the client device 202), and so forth.

The notification manager 212 may be configured to determine whether to modify the notification. The notification manager 212 may be configured to determine whether to modify the notification based on the notification protection level. The notification manager 212 may be configured to modify the notification when the notification protection level is determined based on the scenario that the authorized user is, for instance, near the client device 202 but in a public location or other area where sensitive information should not be displayed or rendered on the client device. The notification manager 212 may be configured to modify the notification based on the comparison of the notification protection level to the first and second threshold (described above). For instance, the notification manager 212 may be configured to modify the notification when the notification protection level is, for instance, between the first and second thresholds.

The notification manager 212 may be configured to modify the notification by manipulating, modifying, replacing, removing, obfuscating, altering, randomizing, translating or otherwise changing at least a portion of the notification data received from the notification source(s) 206. In some embodiments, the notification manager 212 may be configured to encode at least some of the notification data. The notification manager 212 may be designed or implemented to change the notification data corresponding to the content of the notification. For instance, the notification manager 212 may be configured to modify the notification data to remove the content (e.g., sensitive information, such as personally identifiable data, meeting times and locations, confidential information) from the notification (while maintaining certain identification information, such as an identification of the source, a time of the notification, and so forth). The notification manager 212 may be configured to modify the notification data to obfuscate the content of the notification. The notification manager 212 may modify the notification data to encrypt, secure, render unreadable, or otherwise encode the content of the notification. The notification manager 212 may modify the formatting of the notification data, e.g., to minimize or otherwise change the font of text, change the color and/or transparency of the text, to increase difficulty in reading the content by an unintended recipient. In each of these embodiments, the notification manager 212 may be configured to modify or change one or more aspects of the notification (and/or to various extent of modification) based on the notification protection level (e.g., according to predetermined ranges for the value of the notification protection level). For example, the higher the value of the notification protection level, the larger is the extent of the modification being applied, and/or the number of aspects of the notification being modified. Such embodiments may secure the content of the notification, thus lessening the likelihood of interception and furthering DLP motivations.

The notification manager 212 may be configured to block the notification received from the notification source(s) 206. The notification manager 212 may be configured to block the notification received from the notification source(s) 206 to the intended client device 202. In some embodiments, the notification manager 212 may intercept the notification and prevent the notification from delivery to the client device 202. The notification manager 212 may be configured to block the received notification when the notification protection level is determined based on the scenario that the client device 202 has for instance been idle for an extended period of time, the authorized user is not near the client device 202, the client device 202 is in an unsecure location, and so forth. The notification manager 212 may block the notification based on the comparison of the notification protection level to the second threshold (described above). For instance, the notification manager 212 may be configured to modify the notification when the notification protection level is, for instance, greater than the second threshold.

In some embodiments, the notification manager 212 may be configured to generate a signal for transmission to the client device 202 which is to receive the notification. The signal may be a signal which, when received by the client device 202, causes the client device 202 to modify one or more settings of the client device 202. The settings may be or include, for instance, settings corresponding to a feature for previewing, displaying or rendering message content in a notification. The notification manager 212 may be configured to generate the signal for transmission to the client device 202 rather than (or in conjunction with) blocking the notification from being sent to the client device 202. For instance, the notification manager 212 may be configured to generate the signal when the notification protection level is determined based on the scenario that the client device 202 has for instance been idle for an extended period of time, the authorized user is not near the client device 202, the client device 202 is in an unsecure location, and so forth. The notification manager 212 may generate the signal based on the comparison of the notification protection level to the second threshold (described above) for instance. For instance, the notification manager 212 may generate the signal when the notification protection level is, for instance, greater than the second threshold. In each of these embodiments, the signal may disable the feature of the client device 202 for previewing/displaying/rendering the message content of the notification. In such embodiments, the notification may (or may not) still be delivered to the client device 202. However, the content of the notification would not be rendered on the screen of the client device 202.

As notifications are received for each of the client device(s) 202, the policy engine 210 and notification manager 212 may determine the notification protection level and selectively allow, modify or block the received notification(s) according to a notification protection level determined for the corresponding client devices 202. In some embodiments, a given notification may be intended for several client devices 202. In such embodiments, the policy engine 210 and may be configured to determine the notification protection level for each of the client devices 202, and the notification manager 212 may be configured to selectively allow, modify or block the received notification(s) according to the notification protection level determined for each of the corresponding client devices 202. As such, notifications may be allowed, modified, or blocked on a client device-by-client device basis according to the notification protection level determined for each of the client devices 202.

It is noted that the present systems may be adapted, modified, configured, etc. to perform various other functions and include other features. For instance, the notification server may be implemented in a cloud environment (such as Citrix Cloud) such that local devices (e.g., the client devices 202, APIs 208, notification source(s) 206, etc.), may not be changed to support certain features discussed herein. Rather, the notification server implemented in a cloud-based environment may manage local devices and/or local applications (and any other applications which may be managed by the cloud environment). Hence, the notification server may provide a notification push management service. In such embodiments, the cloud-based server may receive the information from or corresponding to the client device 202 (e.g., the proximity information, idle state information, contextual information, etc.). The cloud-based server may push the full notification, modified notification, or block the notification to the client device 202 according to the notification protection level, as described above.

Such information notification protection levels may be used in other environments and contexts. For instance, the notification protection levels may be used by an analytics service (such as Citrix Analytics Service (CAS)). The analytics service may receive the notification protection levels as a report for different applications and how the notification protection level is calculated/executed in various client devices and in various contextual situations. Such information may be very helpful in understanding how notification privacy is protected and secured from the perspective of big data. Also, by incorporating relative locations of a client device and an authorized user into the calculus, users may be informed on how to better protect privacy and data, which may increase user behavior and traits over time.

In some embodiments, the notification server 204 may be deployed and managed in an environment, such as the Citrix Software Defined Perimeter (SDP). In such embodiments, the policy may be unified and replicated to various devices and applications. Based on the context that client devices 202 and applications are involved, the policy engine 210 may individually apply the policies described herein to operate in various scenarios and conditions.

Lastly, the embodiments described herein, such as the notification server 204, may be incorporated into various mobile interface managers such as Citrix's Endpoint Management. Further, certain functionalities of the notification server 204 (e.g., the policy engine 210 and notification manager 212) may be moved into, built into, execute within, or otherwise incorporated into the client device 202 or an application of the client device 202, to achieve similar or the same results, and is within the contemplation of this disclosure.

Figure 3:
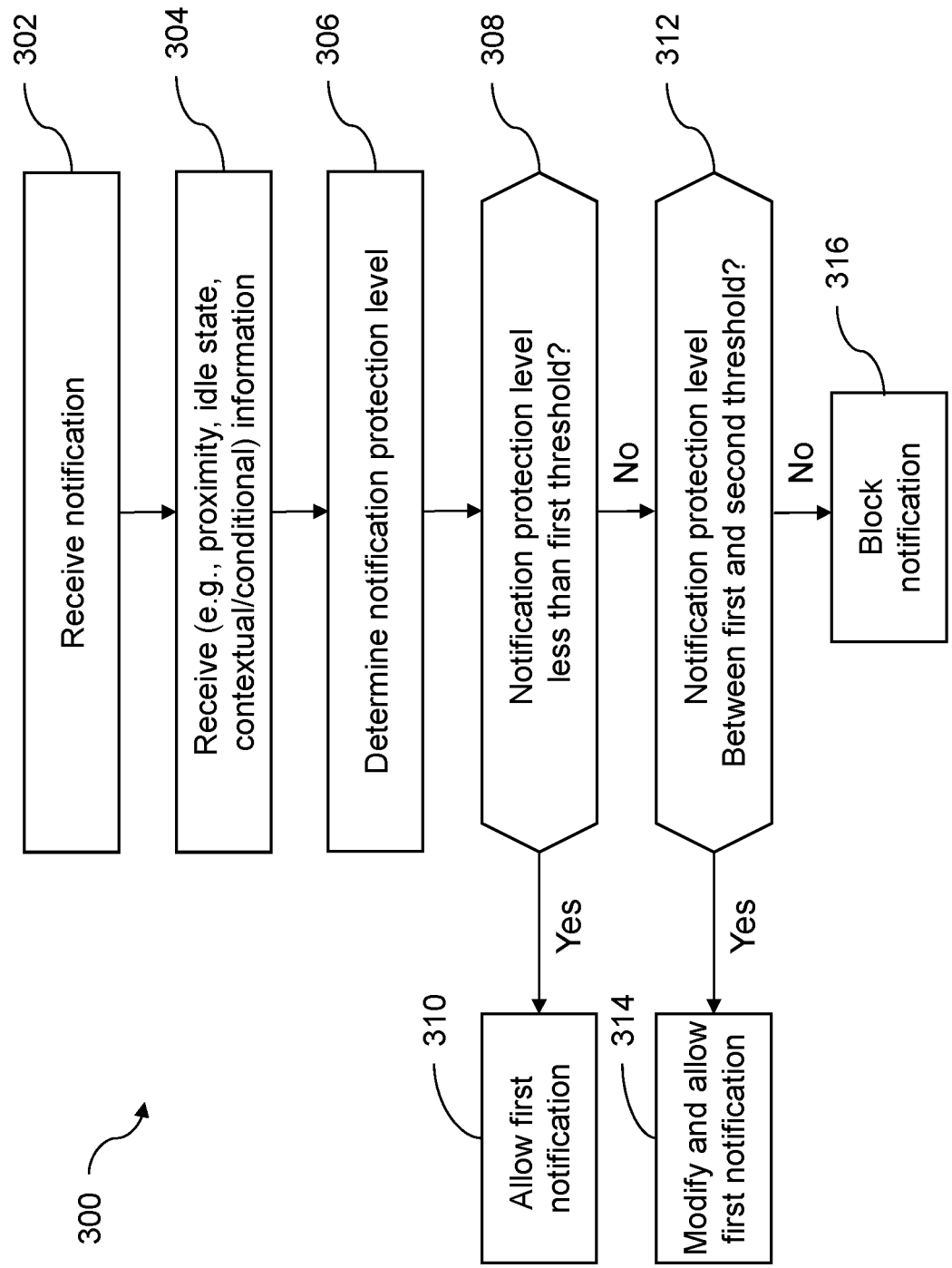
FIG. 3 is a flow diagram for a method for managing delivery of notifications.

Referring now to FIG. 3, depicted is a flow diagram for a method 300 for managing notifications. The functionalities of method 300 may be implemented using, or performed by, the components described in FIGS. 1-2, such as the client device(s) 202, the notification server 204, etc. In brief overview, a notification server (sometimes referred as a server or computing device) receives a notification (302). The notification server receives first (e.g., proximity) information and second (e.g., idle state) information (304), e.g., from at least one client device 202 and/or at least one monitoring system. The notification server determines a notification protection level (306). The notification server determines whether the notification protection level is less than a first threshold (308). Where the notification protection level is less than the first threshold, the notification server allows the notification (310). Where the notification protection level is greater than the first threshold, the notification server determines whether the notification protection level is between the first threshold and a second threshold (312). Where the notification protection level is between the first and second threshold, the notification server modifies and allows the notification (314). Where the notification protection level is not between the first and second threshold, the notification server blocks the notification (316).

At operation (302), and in some embodiments, a notification server receives a notification. In some embodiments, the notification server receives or intercepts a notification (and/or other notification(s)) from at least one notification source. The notification server may be in communication with a client device and the at least one notification source. The notification may be for rendering on at least a screen of the client device. The notification may be a push notification from the notification source. In some embodiments, the notification may be pushed from the notification source to the notification server as the notification is generated by the source (e.g., based on a trigger event). In some embodiments, the notification may be pushed to the notification server at a scheduled time. In each of the embodiments, the notification server may receive the notification. In some embodiments, the notifications may include sensitive information (such as confidential, enterprise, personally identifiable, private, etc., information). As such, it may be desirable to protect the information contained in the notifications from unintended persons that can intercept the information from the client device or prior to being received by the client device (e.g., via an insufficiently secured Wi-Fi network of the client device).

In some embodiments, the at least one notification source includes a SaaS application, a virtual desktop, or a virtual application (e.g., the hosting or provisioning server of such an application). Various non-limiting examples of such notification source(s) include, for instance, server(s) in communication with mobile device applications available on an application store, Microsoft® Outlook or other email service, document sharing and storage applications or services (such as Dropbox®), and so forth. Each of such notification source(s) may generate notifications, and transmit those notifications to the client devices (e.g., through the notification server). The notification server may intercept or receive the notifications from the notification sources.

At operation (304), the notification server receives first (e.g., proximity or other) information and second (e.g., idle state or other) information. In some embodiments, the notification server may receive first information (or proximity information) indicative of a distance, physical or spatial separation, or proximity between the client device and a user (e.g., an authorized user) of the client device, which can be measured or provided using any distance unit (e.g., meter, feet, yard). The notification server may receive second information comprising idle state information of the client device (e.g., idle state information of at least one of 1) the client device or 2) an application executing on the client device). Hence, the notification server may receive proximity information and/or idle state information. In some embodiments, the first information and/or the second information can be any other type of information (e.g., contextual information). The first information and the second information can be different types of information. The notification server may use the contextual information, proximity information, the idle state information, and/or other type of information, to determine a notification protection level, as described illustratively below.

The notification server may identify the proximity between the client device and authorized user by identifying a location of the client device and identifying or estimating a location of the authorized user. For instance, the notification server may determine the location of the client device. The notification server may determine the location of the client device based on GPS or other positioning data (e.g., based on Wi-Fi network or cellular-based triangulation or positioning) of the client device which is then communicated by the client device or a monitoring system (e.g., at intervals, on demand, continuously or near-continuously, and so forth) to the notification server. The notification server may determine the location of the client device based on an access point for the client device when the client device accesses a network.

The notification server may determine or estimate the location of the authorized user corresponding to the client device. The notification server may receive various information corresponding to the location of the authorized user. As one non-limiting example, the notification server may receive information or data corresponding to a LAN, enterprise private network (EPN), or other enterprise network accessed by the user may with a client device other than the client device assigned to the user. The notification server may identify a source network internet protocol (IP) address accessed or used by the user with the other client device. The notification server may determine whether the user is located based on whether an IP address for the other client device being used by the user to access the enterprise network. As another example, the notification server may determine which client device the user is currently accessing. For instance, where the user logs into a first client device and, subsequently, logs into a second or different client device or endpoint device, the notification server may determine (e.g., via a change in the IP or network address from which the logins occur) that the user is no longer located near the first client device. As yet another example, where the user accesses (e.g., on a client device) a mobile application associated with and/or managed by the enterprise, the notification server may generate a prompt which causes the client device to transmit a current location for the other client device which the user is using. As still another example, where the user accesses a virtualized application or desktop, the notification server may access a network address (such as an address of a personal computer, tablet, thin client, and so forth) from which the user is accessing the virtualized application or desktop. Hence, the notification server may determine a location of the user.

The notification server may determine a proximity of the client device and the authorized user of the client device. The notification server may compare the determined location of the client device (e.g., based on the location data from the client device, data corresponding to an access point for the client device) to the estimated, identified, inferred, etc., location of the authorized user (e.g., based on the information described above). The notification server may determine whether the authorized user is in possession, in close proximity, near, in the same room, etc., as the client device based on the comparison and the relative locations. For instance, the notification server may compare the locations or relative locations with site maps and/or predetermined separation/distance threshold(s) (e.g., that are indicative of the user being in possession, or in the same room, etc.). Such thresholds can be set at specific distances (e.g., 1 meter, 5 meters, and so on) for determining that the user is in possession of the client device for instance. The locations of the user and the client device 202 can be mapped or translated onto locations within a site map, and compared with boundaries of rooms or partitions described in the site map.

The client device(s) may monitor, evaluate, and/or determine various idle state information corresponding to the client device(s) and/or their application(s). In some embodiments, the idle state information may be or include information or data corresponding to whether a user is currently using, or has used the client device (or an application of the client device), e.g., recently or within a certain time window. The client device may identify, determine, generate, etc., the idle state information based on, for instance, an elapsed duration between inputs received from the user, a duration in which the client device is turned off or in "sleep mode," and so forth. The client device may generate idle state information based on such data corresponding to user inputs to or other interactions with the client device. In some embodiments, the client devices may perform various functions responsive to generation of the idle state information. For instance, where a client device generates idle state information indicative of the client device being in an idle state (e.g., an extended duration of non-use), the client device may automatically turn off or darken the screen of the client device. While described above as the client device being in an idle state, in some embodiments, the client device may detect an idle state of an application accessible to the user via the client device.

In some embodiments, the client device may monitor contextual information about the client device and/or application. As some non-limiting examples, the client device may monitor a duration of the client device being in a stationary/static state (e.g., based on GPS data remaining still, gyroscope sensors showing limited to no movement), duration of the screen being in a darkened or low-power state, duration of the client device being in a locked state (e.g., calculating how long the device screen is darkened or in a low-power state or locked, using a clock/timer), whether the screen is covered by an accessory cover (e.g., based on one or more camera sensors or ranging sensors positioned in or near the client device), duration since the client device was last unlocked (e.g., using a clock/timer to track), battery level of the client device (e.g., remaining battery by percentage, or remaining duration of use), reputation of the application (e.g., according to a rating from an application store, from internet reviews, and so forth), category of the application (e.g., based on data from an application store, features/functionalities of the application), time or day of the notification (e.g., if it is when the application or client device is in use, if it is during business hours or not, based on data from a user's calendar, etc.), positioning-related information of the client device (e.g., from GPS data), whether the client device is in a trusted zone (e.g., based on the location of the client device, a network connection for the client device, a GeoFence, and so forth), or a Wi-Fi network of the client device (e.g., based on the Wi-Fi name and type, Wi-Fi reputation, Wi-Fi signal strength, Wi-Fi encryption level, Wi-Fi authentication method, Wi-Fi related security settings, etc.). The client device may generate data corresponding to such monitored conditions and statuses, which may be or correspond to the contextual information.

The client device(s) may deliver various types of information and data to the notification server 204. The client device(s) may deliver, for instance, the idle state information and/or contextual information to the notification server. Thus, the notification server may receive the first information (e.g., information corresponding to the proximity of the client device to an authorized user of the client device) and second information (e.g., idle state information corresponding to the client device and/or an application of the client device). In some embodiments, the notification server may receive the third information (e.g., the contextual information about the client device and/or application).

At operation (306), the notification server determines a notification protection level. In some embodiments, the notification server may determine the notification protection level using the first information and the second information (e.g., received at operation (304)). The notification server may determine the notification protection level by assigning, computing, or otherwise determining a numerical value or representation of the first and second information. The notification server may apply one or more weights to the various information in calculating and/or combining the various information to produce the notification protection level. The notification server may perform a mathematical operation or apply a function on numerical values assigned to the first and second information. For instance, the notification server may multiply the numerical value representing the first information and the numerical value representing the second information, to produce the notification protection level.

In some embodiments, the notification server may determine the notification protection level using the first information, second information, and/or third information (e.g., the contextual information about at least one of the client device or the application). In such embodiments, the notification server may assign a numerical value to the third information (including, optionally, weighting various components or subsets of information included in the contextual information). The notification server may compute the notification protection level by performing a mathematical operation or function on the numerical values assigned to the first, second, and/or third information. For example, the notification protection level may be calculated by multiplying the numeral values of the first, second, and/or third information together, or adding these numerical values with predefined weights applied.

In some embodiments, the notification server may receive the first, second and/or third information, and/or determine the notification protection level, responsive to receiving the notification. In such embodiments, operations (304) and (306) may for instance be performed responsive to operation (302). Hence, the notification protection level may be determined on an on-demand basis. In some embodiments, the notification server may receive the first information and/or determine the notification protection level on a rolling basis, independent of when the notification. In such embodiments, operations (304) and (306) may be performed prior to and/or concurrently with operation (306) for example.

At operation (308), the notification server determines whether the notification protection level is less than a first threshold. In some embodiments, to manage delivery of the notification, the notification server may compare the notification protection level with a threshold (e.g., the first and/or second threshold). The notification server may store or otherwise access a threshold (e.g., a threshold determined or predefined based on a desired privacy or protection level on notifications). The threshold may be indicative of or correspond to a notification protection level where the notification server allows or modifies a notification. The threshold may separate instances where the notification protection level indicates that the authorized user is, for instance, near the client device, the client device is in a safe location, the client device is not idle (or has not been idle for an extended period), and so forth, from instances where the notification protection level indicates that the authorized user is, for instance, near the client device but in a public location or other area where sensitive information should not be provided to the user. The threshold may be indicative or correspond to a notification protection level where the notification server modifies or blocks a notification. The threshold may separate instances where the notification protection level indicates that the authorized user is, for instance, near the client device but in a public location or other area where sensitive information should not be provided to the user, from instances where the notification protection level indicates the client device has been idle for an extended period of time, the authorized user is not near the client device, the client device is in an unsecure location, and so forth. In some embodiments, the notification server may include, store, or otherwise access two thresholds (e.g., a first threshold indicative of or corresponding to a notification protection level where the notification server allows or modifies a notification, and a second threshold indicative or corresponding to a notification protection level where the notification server modifies or blocks a notification).

At operation (310), and in some embodiments, the notification server allows the notification. In some embodiments, the notification server allows the received notification (e.g., to be passed to and/or rendered on the client device) according to the determined notification protection level. In some embodiments, the notification manager 212 may be configured to allow the notification to be delivered to the intended client device 202. The notification manager 212 may be configured to allow the notification to be delivered to the intended client device 202 when the notification protection level indicates that the authorized user is, for instance, near the client device 202, the client device 202 is in a safe location, the client device 202 is not idle (or has not been idle for an extended period), and so forth. The notification manager 212 may allow the notification to be delivered to the intended client device 202 based on the comparison of the notification protection level to the first threshold (e.g., described above). For instance, where the notification protection level is less than the first threshold, the notification manager 212 may allow the notification to be delivered to the intended client device 202. The notification manger 212 may push the notification to the client device 202 for rendering, and the client device 202 may receive and render the notification.

At operation (312), the notification server determines whether the notification protection level is between the first threshold and a second threshold. In some embodiments, operation (312) may be similar in at least some aspects to operation (308). The notification server may compare the notification protection level to the first and second threshold. The notification server may determine whether the notification protection level is between the first and second threshold.

At operation (314), and in some embodiments, the notification server modifies and allows the notification. In some embodiments, the notification server modifies the received notification according to the determined notification protection level. The notification server may include or retain information/data corresponding to the structure of notification data received from a notification source via an API. The notification server may identify portions of the notification (e.g., received at operation (302)) which contain content of the notification. The notification server may remove, encode, or obfuscate at least part of the content of the notification. Such embodiments may secure the content of the notification, thus lessening the likelihood of interception and furthering DLP motivations.

The notification server may modify the notification by manipulating, modifying, replacing, removing, altering, or otherwise changing the notification data received from the notification source(s). In some embodiments, the notification server may encode at least some of the notification data. The notification server may change the notification data corresponding to the content of the notification. For instance, the notification server may modify the notification data to remove the content (e.g., sensitive, confidential data) from the notification (while maintaining certain identification information, such as an identification of the source, a time of the notification, and so forth). The notification server may modify the notification data to obfuscate some portion of the content of the notification. The notification server may modify the notification data to encrypt, secure, or otherwise encode the content of the notification. In each of these embodiments, the notification server may modify or change one or more aspects of the notification based on the notification protection level.

In some embodiments, the notification server may block the notification from being sent to the client device, deactivate notifications on the client device, or deactivate a feature of the client device for previewing/displaying/rendering of message content, if the notification server is incapable of modifying the received notification according to the determined notification protection level. The notification server may determine whether the notification data from the notification server is modifiable. The notification server may determine whether the notification data is modifiable based on whether the notification server includes information corresponding to the structure of the notification data, whether the notification server can identify the data corresponding to the content of the notification, and so forth.

Where the notification server cannot modify the notification data, in some embodiments, the notification server may generate a signal for transmission to the client device 202 that is to receive the notification. The signal may be a signal which, when received by the client device, causes the client device to modify one or more settings of the client device. The settings may be or include, for instance, settings corresponding to a feature for previewing/displaying/rendering message content in a notification, settings to disable notifications, and so forth. The notification server may generate the signal for transmission to the client device rather than (or in conjunction with) blocking the notification. For instance, the notification server may generate the signal when the notification protection level indicates the client device has been idle for an extended period of time, the authorized user is not near the client device, the client device is in an unsecure location, and so forth. The notification server may generate the signal based on the comparison of the notification protection level to the second threshold (described above). For instance, the notification server may generate the signal when the notification protection level is, for instance, greater than the second threshold. In each of these embodiments, the signal may disable the feature for previewing/displaying/rendering the message content of the notification, disable notifications on the client device, etc. In such embodiments, the notification may (or may not) be delivered to the client device. However, the content of the notification would not be rendered on the screen of the client device.

At operation (316), and in some embodiments, the notification server manages delivery of the notification to the client device by blocking the notification to the client device. In some embodiments, the notification server blocks the received notification according to the determined notification protection level. The notification server may block the notification received from the notification source(s). The notification server may block the notification received from the notification source(s) from being sent to the intended client device. In some embodiments, the notification server may intercept the notification and prevent the notification from delivery to the client device. The notification server may block the received notification when the notification protection level indicates the client device has for instance been idle for an extended period of time, the authorized user is not near the client device, the client device is in an unsecure location, and so forth. The notification server may block the notification based on the comparison of the notification protection level to the second threshold (e.g., described above). For instance, the notification server may modify the notification when the notification protection level is, for instance, greater than the second threshold.

In some embodiments, the notification may be for rendering on a screen or other interface of each of a plurality of client devices. The notification server may allow, modify, or block the notification for each of the plurality of client devices according to a notification protection level determined for the corresponding client device. In such embodiments, the notification server may determine the notification protection level for each of the client devices, and selectively allow, modify or block the received notification(s) according to the notification protection level determined for each of the corresponding client devices. As such, certain notifications may be allowed, modified, or blocked on a case-by-case basis according to the notification protection level determined for the respective client device.

C. Systems and Methods for Tagging Notifications

The present disclosure is directed towards systems and methods for tagging notifications. Various applications and other notification sources may be offered to members of an organization for instance. Each of the notification sources may generate and deliver notifications to client devices of the members. The systems and methods described herein may tag notifications from the notification sources (e.g., native-installed applications, virtualized applications, Software as a Service (SaaS) applications, etc.) by introducing a policy-based service framework. Such embodiments may increase user productivity by limiting interruptions and distractions caused by notifications, or by emphasizing certain notifications. Users may be notified of more important notifications which may involve interactive action/feedback from the user. The notifications may be tagged with various possible types of tags having various formats (e.g., invisible or visible tags, for instance), such as follow-up tags, urgent tags, priority tags, conceal tags, and so forth. The tagged notifications may be delivered to a client device. The client device may include a notification center (also referred to as notification service) having a hook. The hook may cause the client device to render the notification on the client device based on the tag.

Enterprises may offer many applications to their employees. During a given workday, an employee may have five or more applications open, executing, or otherwise running on their client device simultaneously. Such applications may cause interruptions or otherwise overwhelm employees by inundating the employees with notifications. Rather than ceasing notifications, it may be beneficial to selectively render various information from notifications (or a subset of notifications received by the client device). On the one hand, notifications save time by introducing shortcuts or other selections of information rather than causing the user to switch application. On the other hand, notifications can cause distractions which may interrupt end users.

According to the present solution, the present disclosure is directed to systems and methods for managing delivery of notifications to a client device. A server in communication with a client device may receive a notification from at least one notification source. The notification may be for rendering on a screen of the client device. A policy engine of the server may identify a context of the notification. The policy engine may apply a tag to the notification based on the context of the notification. The server may deliver the notification including the tag to a notification service of the client device. The notification center may manage the notification at the client device in accordance with the tag.

In some implementations, the systems and methods described herein may be at least partially embodied on a workspace server (such as Citrix Cloud Workspace). In some implementations, local client devices would not have to be modified to support the present systems and methods—rather, the client device may launch a user workspace that support notifications using systems and methods already implemented therein. In some implementations, a notification service of the client device may be hooked to parse tags corresponding to notifications sent to the client device from the workspace server for instance. The notification service (sometimes referred to as a notification center) may manage the notification in accordance with the tag(s). In some implementations, an analytics service (such as Citrix Analytics Service) may receive feedback from the server applying the tags to the notifications. The analytics service may receive the feedback for identifying how notifications having various contexts are tagged and rendered at the client device. The analytics service may generate reports (e.g., on increased efficiency, user behavior, etc.) that leverage information and feedback from the server applying the tags to the notifications. In some embodiments, the server and/or policies may be implemented, deployed, or otherwise managed within a software defined perimeter (e.g., a computing environment in which access to certain applications, programs or services is permitted to a client device when the client device is authenticated). Such embodiments may provide for a unified policy that can be implemented, provided, reproduced, or otherwise replicated to various other devices and applications (including, for instance, mobile client devices, desktops and laptops, virtual computing environments, etc.).

Rather than disrupting employees, the present technical solution adds tags to notifications based on an identified context for the notification. The notification service may then manage the notification at the client device in accordance with the tag. For instance, the notification service may selectively render the notification, modify and render the notification, and so forth based on the tag. Such implementations may limit disruption to users (e.g., employees) by limiting the number of notifications displayed to a user. In some implementations, the tag may correspond to an urgent notification. The notification service may render the notification in accordance with the tag to draw an employee's attention to the notification. The present technical solution may therefore focus an employee's attention on urgent matters while limiting disruptions caused by less urgent (or distracting) notifications, thus increasing an employee's efficiency and effectiveness.

Figure 4:
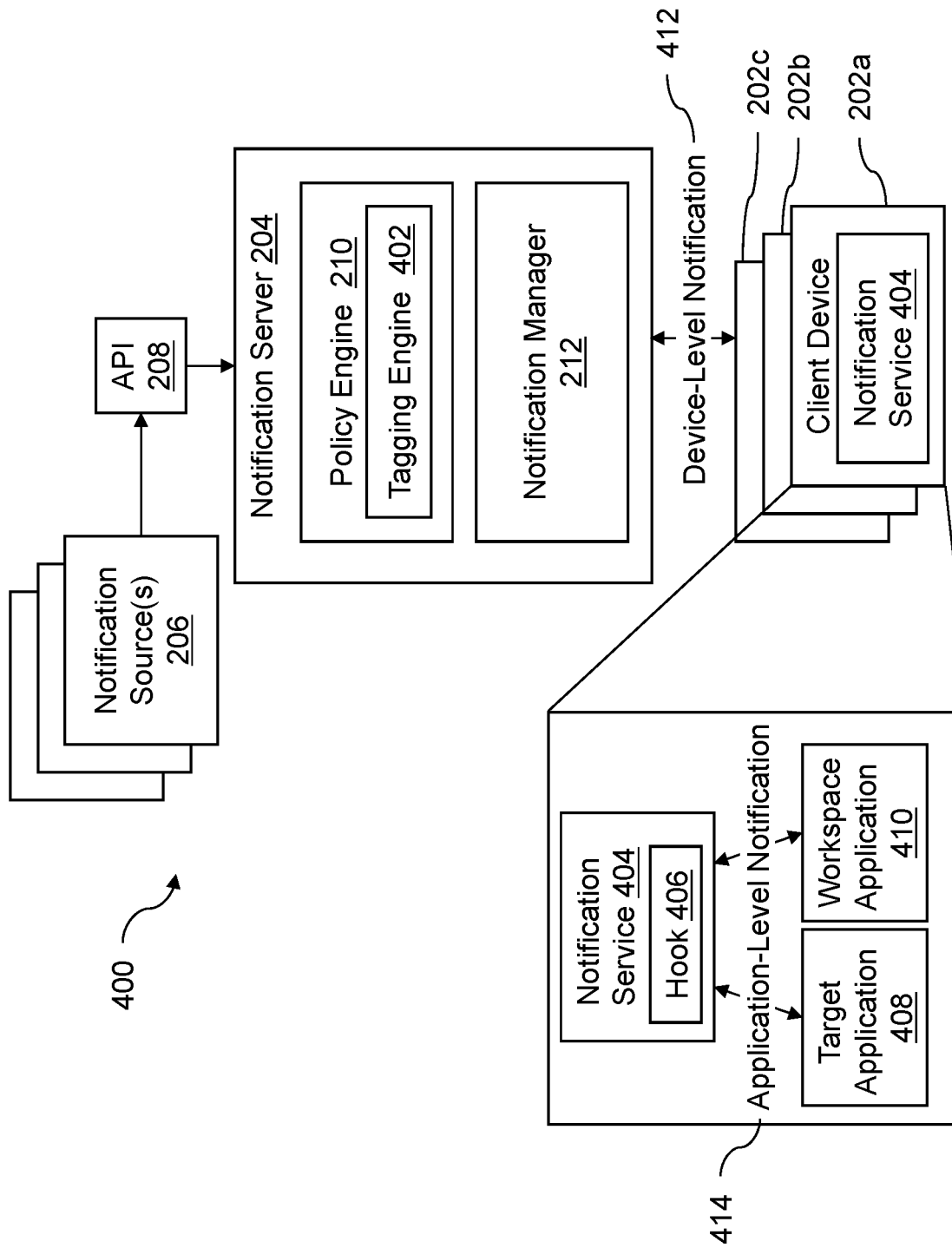
FIG. 4 is a block diagram of an example embodiment of a system for tagging notifications.

Referring now to FIG. 4, depicted is another embodiment of a system 400 for delivery of notifications. The system 400 depicted in FIG. 4 may be similar in some aspects to the system shown in FIG. 2 and described above. However, the present disclosure is not limited by the foregoing description. Similar to the system 200 described above, the system 400 is shown to include a plurality of client devices 202, a notification server 204, and a plurality of notification sources 206. The notification server 204 is shown to include a policy engine 210 having a tagging engine 402 and a notification manager 212. The notification server 204 may be configured to receive a notification from a notification source for rendering on a screen at a client device 202. The policy engine 210 may be configured to identify a context of the notification. The tagging engine 402 of the policy engine 210 may be configured to add a tag to the notification according to the context. The tag may control rendering of the notification at the client device 202. The notification manager 212 of the notification server 204 may be configured to transmit the notification with the tag to a notification service 404 of the client device 202. The notification service 404 is configured to manage the notification at the client device 202 in accordance with the tag.

The notification server 204 may be arranged intermediary to the notification sources 206 and one or more client devices 202. The notification sources 206 (e.g., Microsoft® Outlook or other email service, document sharing and storage applications such as Dropbox®, Google Drive®, social media servers/services) may deliver notifications to the notification server 204 (e.g., through at least one API 208). The notification server 204 may be configured to receive notifications from the notification source(s) 206. The notification server 204 may be configured to receive notifications from notification source(s) 206 which are intended to be delivered to the client devices 202. Hence, the notification source(s) 206 may deliver notifications to the client devices 202 through the notification server 204, as described above. The notification server 204 may be configured to deliver notifications to the client devices 202.

As described above, the policy engine 210 may be any device(s) or component(s) designed or implemented to apply at least one policy to data and information received from various sources. The policy engine 210 may be configured to apply one or more policies to notifications received from the notification sources 206 via the API 208. As described in greater detail below, the policy engine 210 may be configured to apply one or more policies to determine a context of the notifications received from the notification source(s) 206. The policy engine 210 may be configured to determine a context of the notifications for applying (by a tagging engine 402 of the policy engine 210) one or more tags to the notifications.

Each notification may include, for instance, a header field, a timestamp, a body field, etc. The header field may indicate the source of the notification (e.g., the notification source 206 which transmitted the notification). The header field may indicate the destination of the notification (e.g., an identifier for the client device 202 or user of the client device 202, such as an Internet Protocol (IP) address for the client device 202, a username, phone number, email address, etc., associated with a user of the client device 202, and so forth). The header field may include a flag corresponding to an urgency, priority, and/or importance of the notification. The flags may include an urgent flag, a follow-up flag, etc. The flag(s) may be assigned to the notification by the notification source 206, a user that generated the notification on an application corresponding to the notification source 206, etc. The timestamp may indicate a time at which the notification was generated by the notification source 206, a time at which the notification was sent by the notification source 206 to the notification server 204, a time at which the notification was received by the notification server 204 from the notification source 206, and so forth. The body field may include content, such as text, media (e.g., images, audio, video, graphics, and so forth), which is to be rendered on a screen for the client device 202.

The policy engine 210 may be configured to determine a context of the notifications. Context, as used herein, may refer to a specific background, condition, setting and/or relevant aspects of the notification by which the notification may be interpreted or understood. The policy engine 210 may be configured to determine the context of a notification based on data from the notification, data associated with the client device receiving the notification, the notification source 206 which generated the notification, an associated user, and so forth. The policy engine 210 may be configured to parse the notifications to extract information from the notifications for determining the context of the notifications. The policy engine 210 may be configured to determine the context of the notification based on information from the header field, timestamp, body field, and so forth. In some embodiments, the policy engine 210 may be configured to determine the context of the notification based on the contextual information corresponding to the client device 202 (e.g., a network connection of the client device, information about a location of the user of the client device, etc.), as described above in Section B.

In some implementations, the policy engine 210 is configured to parse the notification to identify the header field of the notification. Each notification may include a header field. The policy engine 210 may be configured to parse the header field of the notification to obtain, locate, extract, or otherwise identify information within the header field. The policy engine 210 may be configured to identify the notification source 206 of the notification. Each notification source 206 may be associated with a particular application. The policy engine 210 may be configured to identify the notification source 206 to determine which application corresponds to the notification. The policy engine 210 may be configured to determine a context of the notification based on the application corresponding to the notification.

The policy engine 210 may be configured to determine an application type (or the type of application) corresponding to each notification. In some embodiments, the policy engine 210 include, maintain, communicate with, or otherwise access a table, database, or other data structure. The data structure may include a list or ledger of applications and corresponding application types. Each application which may be accessed by a user on the client device 202 may have a specific application type (e.g., productivity, finance, social media, game, lifestyle, and so forth). The applications which are accessible by the user (e.g., via the client device 202) may be included in the data structure. As new applications are made available to the user, the data structure may be updated to include the new applications. The policy engine 210 may be configured to cross-reference data corresponding to the application (e.g., the application name, a unique identifier associated with the application, and so forth) with the data structure to identify the application type. In some embodiments, each notification may include data corresponding to the application type (e.g., in the header field or metadata of the notification, for instance). The policy engine 210 may be configured to parse the metadata and/or header field of the notification to identify the application type indicated therein.

The policy engine 210 may be configured to determine the context based on the application type. In some embodiments, the policy engine 210 include, maintain, communicate with, or otherwise access a table, database, or other data structure (which may be the same as or similar to the data structure described above for identifying application type). The data structure may include a list or ledger of application types and corresponding contexts. Each type of application may be associated with a particular context. For instance, an application type for social media applications and game applications may have a personal context, whereas an application type for productivity or finance applications may have a business context. The policy engine 210 may be configured to determine the context corresponding to a notification based on the application type of the application which generated the notification.

In some embodiments, the policy engine 210 may be configured to determine the context based on an indication (e.g., flags or identifiers, indicating urgency, importance, priority, or a follow-up for instance) for the notification. For instance, some notifications may have a flag corresponding thereto. The flags may be assigned, generated, incorporated into, or otherwise associated with the notification by a person generating the notification. For instance, where the notification corresponds to an email, the email may be marked with an "URGENT" flag, a "FOLLOW-UP" flag, etc. The flags may be included in the header field, metadata, etc. for the notification. The policy engine 210 may be configured to parse the notification to identify the flag corresponding thereto. The policy engine 210 may be configured to determine the context based on the presence (and/or absence) of specific flags.

The policy engine 210 may be configured to determine the context by parsing the body or content of the notification. In some embodiments, the policy engine 210 may include a probabilistic model trained via a machine learning algorithm to detect (or assign a probability to) contexts based on the content of the notification. The machine learning algorithm may generate the probabilistic model using a plurality of training sets including sample notifications and corresponding contexts. The probabilistic model may intake or otherwise receive the notifications (e.g., as an input) and assign a probability to the context of the notification based on the content of the notification.

In some embodiments, such as those in which the notification includes a graphic, image, video, audio, or other media content, the policy engine 210 may be configured to determine the context of the notification using one or more local or third-party services (e.g., through a corresponding Application Programming Interface (API)) configured to automatically detect, parse, or otherwise identify content or importance/urgency/priority of the notification based on the media content. For instance, where the media content is an image, the policy engine 210 may be configured to include or otherwise access an image processor configured to identify a context of the image. As another example, where the media content is audio, the policy engine 210 may be configured to provide the audio data to a third-party API corresponding to a voice recognition service configured to tag the audio content to identify its context.

In some embodiments, the policy engine 210 may be configured to determine the context of the notification based on contextual information corresponding to the client device 202 (e.g., a smartphone, tablet device, laptop). The contextual information may refer to data corresponding to a condition, state, operational mode and/or status of the client device 202 and/or an application which is accessed via the client device 202. Determination of the contextual device is described in greater detail above in Section B. As some non-limiting examples, the client device 202 may be configured to monitor a duration of the client device 202 being in a stationary/static state (e.g., based on GPS data remaining unchanged, gyroscope sensors showing limited to no movement, or a device orientation suggesting non-use), duration of the screen being in a darkened or low-power state, duration of the client device 202 being in a locked state (e.g., calculating how long the device screen is darkened or in a low-power state or locked, using a clock/timer), whether the screen is covered by an accessory cover (e.g., using one or more camera sensors or ranging sensors positioned in or near the client device 202), duration since the client device 202 was last unlocked (e.g., using a clock/timer), battery level of the client device 202 (e.g., remaining battery, percentage full/depleted, or estimated remaining duration of operation), reputation of the application (e.g., according to a rating from an application store, from internet reviews, and so forth), category of the application (e.g., based on data from an application store, its developer, its features, and/or internet reviews), time or day of the notification (e.g., whether the notification is received when the application or client device 202 is in use, during business hours or otherwise, according to data from a user's calendar, etc.), positioning-related information of the client device 202 (e.g., from GPS data or Wi-Fi positioning), whether the client device 202 is in a trusted zone (e.g., based on the location of the client device 202, a network connection for the client device 202, a GeoFence, and so forth), or a Wi-Fi network of the client device 202 (e.g., based on the Wi-Fi name and type, Wi-Fi or internet service provider reputation, Wi-Fi signal strength, Wi-Fi encryption level, Wi-Fi authentication method, Wi-Fi related security settings, etc.). The client device 202 may be configured to generate data corresponding to such monitored conditions, states, operating modes and statuses, which may be or correspond to the contextual information.

In some embodiments, the policy engine 210 may be configured to detect, identify, or otherwise determine user privileges or preferences corresponding to particular users. The policy engine 210 may be configured to apply privilege or user-specific policies targeted at specific users or specific types of users. Each notification (e.g., in the header field) may specify a recipient and/or destination. The policy engine 210 may be configured to parse the notification to identify the recipient of the notification. The policy engine 210 may be configured to store, maintain, include, or otherwise access a database, table, or data structure including identifiers associated with particular users and their respective preferences, privileges, rules, and so forth. The policy engine 210 may be configured to cross-reference the data from the notifications with the data included in the data structure to identify the respective privileges and preferences of the user. In some implementations, the privileges and preferences may be set by a particular user (e.g., the preferences may be personal), set by an administrator (e.g., company-wide privileges/preferences, department-wide privileges/preferences), and so forth. Hence, the determined context may correspond to the notification itself, the sender, and/or the recipient.

The notification server 204 is shown to include a tagging engine 402. The tagging engine 402 may be any device(s) or component(s) designed or implemented to apply, assign, incorporate, add, or otherwise associate at least one tag to notifications received from various notification sources 206. In some embodiments, the tagging engine 402 may be configured to assign the tag(s) to notifications based on the context identified by the policy engine 210. The tagging engine 402 may be configured to apply tags to the notifications such that a notification service 404 of the client device 202 renders the notification in accordance with the tag. In some embodiments, the tagging engine 402 may be configured to apply a plurality of tags to a notification. Various examples in which the tagging engine 402 may apply a plurality of tags are described in greater detail below.

As described above, each notification may include a body, content, payload, etc. The notifications may also include a title, header, etc. The notification server 204 may be configured to incorporate, include, append or otherwise add the tag within the notification. Below is an example notification:

```
{
    "aps": {
        "alert": {
            "body": "Push notification body",
            "title": "Push notification title"
        },
        "mutable-content": 1
    },
    "media-url": "https:// sharefile.com /t4QYUSDx.jpg"
}
```

The notification server 202 may receive the notification from a notification source 206. The notification server 202 may incorporate the tag into the body (or content, payload, etc.) or the title (or header). The tag can be a visible tag that is readable by a person. In this example, the notification server 202 may add an "important" tag to the notification. As shown below, the notification server 202 may add the "important" tag or keyword to the title (or to the body in some embodiments).

```
{
    "aps": {
        "alert": {
            "body": " From Manager: Push notification body",
            "title": " [Important] Push notification title"
        },
        "mutable-content": 1
    },
    "media-url": "https://sharefile.com/t4QYUSDx.jpg"
}
```

In some embodiments, the tags may be visible tags that may be unreadable by a person. The tags may include characters/strings that the client device 202 can decode or easily identify, but a human cannot easily comprehend or interpret in viewing these characters/strings, such as hashed string (such as encode64), transformed string or similar unreadable ink in Cyrillic language: (i.e., ҖѪ , and so forth. Continuing the above example, the notification server may incorporate the important tag as a visible (and unreadable) tag as shown below.

```
{
  "aps": {
    "alert": {
      "body": "From Manager Push notification body",   //From Manager
      "title": " [Test] Push notification title"        //[Test]
    },
    "mutable-content": 1
  },
  "media-url1": "https://sharefile.com/t4QYUSDx.jpg"
}
```

As another example, the tags may be invisible tags. The invisible tags may include characters/strings that a machine such as the client device 202 can detect, decode or easily identify, but a human cannot see or read by human eyes. The notification server 204 may for instance incorporate HTML code or other strings/values which the client device 202 can decode, but a human cannot read see or comprehend, as shown below.

```
{
  "aps": {
    "alert": {
      "body": " " ": Push notification body" //  
      "title": " " " Push notification title" //  
    },
    "mutable-content": 1
  },
  "media-url1": "https://sharefile.com/t4QYUSDx.jpg"
}
```

In some embodiments, the tagging engine 402 applies priority tags to reflect, provide, supply, reference, or otherwise indicate a priority of the notification. The tagging engine 402 may apply priority tags to notifications to indicate their respective priority. For instance, the tagging engine 402 may apply priority tags to indicate a higher priority (e.g., urgency and/or importance) to notifications from applications having an application type of business or productivity than applications having an application type of social media or entertainment. The notification service 404 of the client device 202 may manage the notifications in accordance with their priority. As another example, the tagging engine 402 may apply priority tags to indicate a higher priority based on the user initiating the notification in comparison to the user receiving the notification. For instance, where a notification is initiated by a superior, the tagging engine 402 may apply a higher priority tag. As yet another example, the tagging engine 402 may apply priority tags to indicate a higher priority of notifications which solicit feedback or follow-up actions from a user of the client device.

In some embodiments, the tagging engine 402 applies emphasis tags to indicate, highlight, or otherwise direct the user's attention to a certain notification or to portion(s) of the notification. Where the context of the notification indicates that certain information in the content or body of the notification is relevant to the user, the tagging engine 402 may apply emphasis tags which cause the notification service 404 of the client device 202 to emphasize the notification or a relevant portion of the notification (e.g., by changing a color, size, background color, etc., of that portion of the body of the notification, removing or redacting other portions of the notification to draw the user's attention to the relevant/emphasized portions of the notification, and so forth). In some embodiments, the tagging engine 402 applies follow-up tags to solicit, request, obtain, or otherwise receive feedback or actions from the user receiving the notification. The tagging engine 402 may apply the follow-up tags to indicate that the notification requests feedback or other actions by the user. Hence, the tagging engine 402 may apply the follow-up tag where some follow-up action from the user is needed or suitable. In some embodiments, the tagging engine 402 applies invisible tags to redact, mask, obfuscate, or otherwise conceal the tag from being viewable to a user. The tagging engine 402 may apply invisible tags to conceal portions of the tag when the notification is determined to include non-business related content, personal content, distracting content, etc. The invisible tags may include or embed code or strings (e.g., special HTML code, for instance), which is machine-readable but typically not human-readable/viewable. In each of these embodiments, the tagging engine 402 may be configured to apply tags to the notification based on the context of the notification. The notification service 404 of the client device 202 may be configured to manage the notification in accordance with the tags applied by the tagging engine 402, as described in greater detail below.

Depicted below in Table 1 is a table showing a plurality of example applications, application types, users generating, sending, or otherwise initiating the notifications, context of content, and corresponding tags which may be applied to the notification by the tagging engine 402.

TABLE 1

Example Tags applied to Notifications based on Context

| Application | Application Type | User Initiating Notification | Context of Content | Tag |
|---|---|---|---|---|
| Workday | Business | From subordinate | Time Off request | Follow-up tag (e.g., action required) |
| Jira | Productivity | From public email address | Code change (e.g., set point for software development and collaboration) | Emphasis Tag (e.g., for your information) |
| Concur | Travelling | From Managers | Approval/refusal of request from manager | Emphasis Tag (e.g., important) |
| WhatsApp | Entertainment | From friends | Dinner or social event (e.g., hang out tonight) | Invisible Tag |

TABLE 1-continued

Example Tags applied to Notifications based on Context

| Application | Application Type | User Initiating Notification | Context of Content | Tag |
|---|---|---|---|---|
| Outlook/ Mailbox related API | Productivity | From Managers | Meeting reminder/notification (one-to-one meeting with CEO); initiated in a non-office zone | High Priority Tag and Follow-up Tag (e.g., involving a VIP) |

As can be seen in Table 1 above, the tagging engine 402 may be configured to apply various tags based on the user or source initiating the notification, the parsed context of the notification, the application and/or the application type, and so forth. Each of these tag(s) applied to the notification by the tagging engine 402 may trigger different functions or actions by the notification service 404 of the client device 202, as described in greater detail below. Some notifications may include a plurality of tags applied thereto. For instance, the meeting notification may include a plurality of tags. The tagging engine 402 may apply a high priority tag to the meeting notification because the notification (e.g., meeting invitation) was generated by an employee's manager(s). The tagging engine 402 may apply a follow-up tag to the notification because the notification solicits a response from the employee (e.g., whether the employee is available for a meeting at a particular time).

In some embodiments, the tagging engine 402 may be configured to apply various tags based on the contextual information of the client device 202. The tagging engine 402 may receive the contextual information of the client device 202 from the client device 202, from the policy engine 210, and so forth. The tagging engine 402 may apply various tags to the notification based on the device location (e.g., based on GPS data from the client device), based on the network in which the client device 202 is connected, based on the time of day or day of the week, based on the client device 202 owner, based on the client device 202 user (e.g., based on who is logged into or otherwise using an application of the client device 202) which may be different from the client device 202 owner, and so forth.

Depicted below in Table 2 is a table showing a plurality of example contextual information of the client device 202 and corresponding tags which may be applied to the notification by the tagging engine 402.

As can be seen in Table 2 above, the tagging engine 402 may be configured to apply various tags based on various contextual information of the client device 202. Similar to the example described above, some notifications may include a plurality of tags applied thereto. For instance, the tagging engine 402 may tag the notification received during a paid time off (PTO) day with a low priority tag (as it is the employee's day off). Further, the tagging engine 402 may apply an invisible tag to the notification because the application log-in user is different from the device owner. Each of these tags may trigger different functions or actions by the notification service 404 of the client device, as described in greater detail below.

The system 200 is shown to include a client device 202. The client device 202 may be similar in some aspects to the client device 202 described above in Section B with reference to FIG. 2. The client device(s) 202 may be or include, for instance, a desktop computer, a laptop computer, a smart phone or mobile device, a tablet, to name a few possibilities. The client device(s) 202 may host, execute, deliver, or otherwise provide applications or resources to a user. For instance, the client device(s) 202 may include a display or screen which renders a user interface including notifications corresponding to applications of the client device 202. In some embodiments, the client device(s) 202 may be configured to render (e.g., display, stream, play, in visible and/or audible form or otherwise) notifications from the various applications and sources (such as notification sources 206) on the screen/interface of the client device 202. In some embodiments, one of the client devices 202 may be different from other client devices 202. For instance, the first client device 202a may be or include a desktop computer, and the

TABLE 2

Tags applied to Notifications based on Contextual Information of Client Device

| Device Location | Time and Date | Connected Network | Device Owner | App Login User | Tag Types |
|---|---|---|---|---|---|
| Home | Weekend | Home Wi-Fi | David | David | Low Priority Tag (or do not tag, so that user is not interrupted by from-work notifications) |
| Company | Weekday in working time | Company Wi-Fi | David | Mary | Emphasis Tag (e.g., for your information) |
| Library | Weekday outside working time | Public Wi-Fi | Mary | Mary | Low Priority Tag (e.g., from friends) |
| Dining room | PTO Day | Native Cellar Network | Peter | Mary | Low Priority Tag and Invisible Tag | second client device 202b may be or include a mobile device. The first and second client devices 202a, 202b may both be associated with or correspond to a user.

The client device 202 is shown to include a notification service 404 (e.g., notification center). The notification service 404 may be any component, element, code, script, application, or other service executable on the client device 202 (e.g., part of the operating system (OS)) and configured to control, execute, or otherwise cause rendering of notifications on the client device 202. The client device 202 may be communicably coupled (e.g., through the notification server 204) to the notification sources 206 such that the notification service 404 may receive notifications from the notification sources 206 through the notification server 204. In some embodiments, the notification service 404 may be native to the client device 202. For instance, the notification service 404 may be Apple Push Notification Service (APNS), Amazon Simple Notification Service (SNS), Android Cloud to Device Messaging (C2DM), Google Cloud Messaging (GCM), Windows Push Notification Service (WPNS), and so forth. In some embodiments, the notification service 404 may be modified, manipulated, changed, or otherwise incorporated with a hook 406. The notification service 404 is shown to include a hook 406. The hook 406 may be or include any script, process, code, binaries, applications, etc. which is inserted into, incorporated into, or otherwise augment the notification service 404 for extending the functionality of the notification service 404.

The notification service 404 may be configured to render device-level notifications 412 (e.g., notifications pushed to the notification service 404 from a source outside the client device 202) and/or application-level notifications 414 (e.g., notifications pushed to the notification service 404 from an application local to the client device, for instance from a workspace application 410 in communication with the notification service 404). As described in greater detail above, the notifications 412, 414 may include metadata indicating an application corresponding to the notification 412, 414 (e.g., a target application 408 associated with the source of the notification). The notification service 404 may be configured to render the application-level notification 414 on behalf of the target application 406. In some embodiments, the hook 406 may instruct or interoperate with a workspace application 410 to present application-level notifications 414 to the user based on intercepted device-level notifications 412.

The hook 406 may instruct the workspace application 410 to trigger an application-level notification 414 according to (information/instructions embedded in) a tag received by the hook 406 in a device level notification 412. For instance, the hook 406 may convey information/instructions embedded in a tag of the device-level notification 412 to the workspace application 410, or may determine/generate second instructions/information based on first information/instructions embedded in a tag (e.g., instructions for managing or triggering one or more subsequent or follow-up notifications), to convey to the workspace application 410. For example, the instructions can specify a time duration during which an action or response from a user is not detected, after which a follow-up notification can be initiated. The workspace application 410 may be an application configured to present, render, or otherwise manage notifications 414 in accordance with (information/instructions embedded in) the tags from the tagging engine 402.

The notification service 404 (e.g., the hook 406 of the notification service 404) may be configured to decode, decrypt, decipher, or otherwise analyze the tag(s) applied by the tagging engine 402 to the notification. While described as the hook 406 being configured to perform the parsing of the tag, modification of the notification, and/or rendering the notification, it should be understood that, in some implementations, the notification service 404 may be configured to perform such functions via the hook 406 or via other mechanisms of the notification service 404. In some embodiments, the notification service 404 (e.g., via the hook 406) may be configured to parse the tag applied by the tagging engine 402 to determine how to manage the notification in accordance therewith. The notification service 404 may be configured parse the tag(s) of the notification 412 to identify information corresponding thereto. The tags may be invisible or visible tags as described in greater detail above. Various types of tags may be applied to the notification 412 by the notification server 204. For instance, the tag(s) may indicate a priority of the notification 412, direct the user's attention to portions of the notification, solicit feedback or actions from the user receiving the notification 412, conceal portions of the notification 412, and/or so forth. The notification service 404 may be configured to parse each of the tag(s) applied to a notification 412 to determine the functions for managing the notification 412, 414.

The notification service 404 may be configured to detect a priority of the notifications 412 based on the tag applied by the tagging engine 402 to each device-level notification 412. In some embodiments, each tag may specify a priority (e.g., on a universal scale, relative to other notifications 412 transmitted at substantially the same time, and so forth). The notification service 404 may be configured to detect the priority (e.g., urgency and/or importance) for device-level and/or application-level notification 412, 414. In some implementations, the notification service 404 may be configured to manage the notifications 412, 414 by rendering high priority notifications 412. The notification service 404 may be configured to maintain, identify, include, or otherwise access a priority threshold. The notification service 404 may compare the priority of the notification 412 (e.g., as indicated or otherwise reflected in the tag) to the priority threshold. When the priority of the notification 412 satisfies the threshold, the notification service 404 may render the notification 412, 414. Hence, the notification service 404 may render notifications 412, 414 having a greater priority (e.g., based on the corresponding priority satisfying the priority threshold). In some embodiments, the notification service 404 may be configured to forgo or delay rendering of notifications having a low priority. In some embodiments, the notification service 404 may be configured to render a plurality of notifications in accordance with their respective priorities. For instance, the notification service 404 may be configured to receive a plurality of notifications from the notification server 204. Each notification 412 may have a respective priority (e.g., as indicated in the respective tags). The notification service 404 may be configured to render high priority notification(s) 412, 414 (or portions thereof), e.g., ahead of others, and may delay the rendering of low priority notifications (or portions thereof), e.g., after some others.

In some embodiments, the notification service 404 (e.g., the hook 406) may be configured to modify one or more portions of the application-level notification(s) 414 based on the tag applied by the tagging engine 402 to the device-level notification 412. The notification service 404 may be configured to modify the notification(s) 414 prior to rendering the notification 414. As such, the notification service 404 may be configured to render a modified application-level notification 414 to the user based on the tag applied by the tagging engine 402 to a corresponding device-level notification 412. In some embodiments, the notification service 404 may be configured to modify a portion of the body of the notification 414. As one example, the notification 412 may include an emphasis tag. The emphasis tag may specify, reference, indicate, direct, or otherwise instruct emphasis of particular portions of the notification 412. In accordance with the emphasis tag, the notification service 404 may be configured to emphasize particular portions of the notification 414 body by changing a color, size, background color, etc. of that portion of the body of the notification 414, removing or redacting other portions of the notification to draw the user's attention to the relevant/emphasized portions of the notification 414, and so forth. As another example, the notification tag may include a conceal tag. The conceal tag may be a tag which specifies, references, indicates, directs, or otherwise instructs portions of the notification to be redacted, masked, obfuscated, or otherwise concealed. The notification service 404 may be configured to parse the conceal tag to identify the portion of the notification 414 to conceal (e.g., make unreadable/non-viewable, or make viewable but cannot comprehend). The notification service 404 may be configured to conceal the portion of the notification 414 in accordance with the tag. The notification service 404 may conceal the portion of the notification by watermarking the portion, modifying the text to make the text become illegible, removing the portion from the notification, etc. As yet another example, the notification may include a follow-up tag. The follow-up tag may specify, indicate, or otherwise request a follow-up action from a user (e.g., accepting a meeting). The notification service 404 may be configured to parse the notification to identify a body (or content) of the notification. The notification service 404 may be configured to generate a modified notification which first displays the body of the notification (e.g., which indicates the context of the meeting, the attendees of the meeting, etc.), then a portion of the notification in which the user may provide the requested follow-up action (e.g., buttons, a text input box, etc.).

The notification service 404 may be configured to trigger performance of other functions by other services of the client device 202. In some embodiments, the notification service 404 may be communicably coupled to or otherwise control one or more services of the client device 202. For instance, the notification service 404 may be communicably coupled to an alarm service of the client device 202, a calendar service of the client device 202, a reminder service of the client device 202, image capture device, microphone, virtual assistant, and so forth. The notification may be tagged with a follow-up tag (e.g., designed or implemented to indicate the notification requests or solicit feedback or other actions from the user). The notification service 404 may display the notification until a corresponding action or feedback is provided by the user to the client device 202. In some embodiments, the notification service 404 may be configured to generate prompts with the other services of the client device (e.g., the alarm service, calendar service, reminder service, etc.) to prompt the user to provide the corresponding feedback.

The tag may specify to render the notification via a user interface corresponding to the workspace application 410 (e.g., rather than that of the notification service and/or that of the target application 408). The workspace application 410 may be an application of the notification service 404, configured to initiate rendering of notifications at the notification service 402. Hence, the tag may specify which application, e.g., the target application 408 and/or the workspace application 410, is to initiate or control rendering of the notification. In some embodiments, the tag/notification may also trigger the notification service 404 to render the notification and/or to detect a user action/response. The hook 406 or notification service 404 may be configured to deliver, transmit, push, or otherwise send the notification to the target application 408 and/or workspace application 410 based on the tag. In certain embodiments, the hook 406 communicates at least a portion of the notification and/or tag, and/or information/instructions determined according to the notification and/or tag, to the workspace application 410 and/or target application 408. In some embodiments, the notification/hook does not directly trigger the notification service 404 to render the notification, and instead allows/instructs/configures the workspace application 410 and/or target application 408 to trigger the rendering (e.g., by the notification service 404, the workspace application 410 or the target application 408) of an associated notification under condition(s) indicated by the tag (e.g., after an absence of user action/response over a defined time period, or when a user unlocks the screen of the client device, or when the start of office hours occurs, or when an authorized user logs in or wakes up the client device). For instance, the associated notification may be generated or formed by the notification service 404, the workspace application 410 or the target application 408, according to the at least a portion of the notification and/or tag, and/or the information/instructions determined according to the notification and/or tag.

For example and in some embodiments, where the hook 406 or notification service 404 transmits the notification to the workspace application 410, the workspace application 410 may be configured to generate a workspace notification for rendering on a screen of the client device 202 (e.g., via the notification service 402) based on the notification from the notification server 204. The workspace notification may include content from the received notification. Hence, the workspace application 410 may generate the workspace notification using the notification body or content of the notification received from the notification server 204.

In some embodiments, the tag from the tagging engine 402 may indicate that feedback, input, or other performance at the client device 202 is to be solicited in the notification. The workspace application 410 may be configured to generate a plurality of workspace notifications (e.g., duplicate or follow-up notifications) for rendering by the notification service 402 (or by the workspace application 410 itself). The workspace application 410 may be configured to monitor for feedback from the user. The workspace application 410 may transmit duplicate or follow-up workspace notification(s) to the notification service 402 for rendering at various intervals (or following expiration of a duration of time, such as a number of seconds, minutes, etc.) until the user provides feedback or performs some other action (e.g., in accordance with requirements or conditions indicated by the tag). The workspace application 410 may generate, provide, duplicate and/or transmit the workspace notification to the notification service 402 for rendering until the workspace application 410 is selected or otherwise launched from the background, until the workspace notification is brought into the forefront, until the user selects a button on the workspace notification, until the user acknowledges, views and/or deactivates the notification, and so forth. The workspace application 410 may duplicate and transmit the workspace notification to the notification service 402 for rendering to ensure that the workspace notification does not become stale, or is overlooked or ignored and, accordingly, that the corresponding feedback from the user is received at the client device 202.

Figure 5:
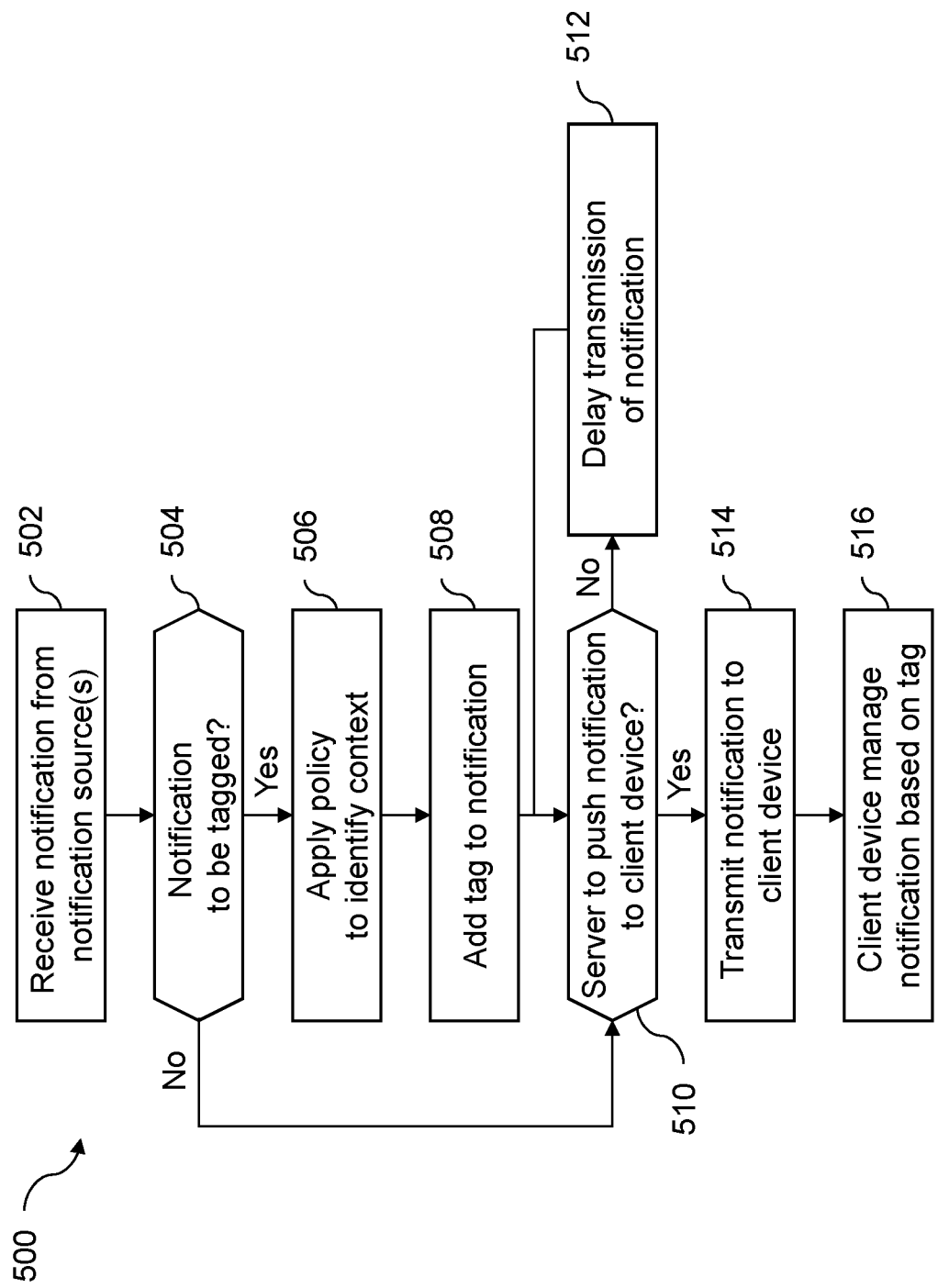
FIG. 5 is a flow diagram for another method for managing delivery of notifications.

Referring now to FIG. 5, depicted is a flow diagram for a method 500 for managing notifications. The functionalities of method 500 may be implemented using, or performed by, the components described in FIGS. 1-4, such as the client device(s) 202, the notification server 204, etc. In brief overview, at step 502, a notification server (sometimes referred as a server or computing device) receives a notification from a notification source. At step 504, the notification server determines whether the notification is to be tagged. At step 506, where the notification is to be tagged, the notification server applies a policy to identify a context. At step 508, the notification server adds a tag to the notification. At step 510, where the notification is not to be tagged, the notification server determines whether to push the notification to the client device. At step 512, the notification server may delay transmission of the notification. At step 514, the notification server may transmit the notification to the client device. At step 516, the client device manages the notification based on the tag.

At step 502, a notification server receives a notification from a notification source. In some embodiments, the notification server may be in communication with a client device. The notification source may be one of a plurality of notification sources. Each notification source may correspond to a respective application of the client device. The notification may be for rendering (a visual notification rendered on a screen, an audio notification rendered via a speaker, etc.) at the client device. The notification server may receive the notification from the notification source when the notification source generates the notification. The notification server may receive the notification from the notification source responsive to a third-party user triggering the notification. The third-party user may be providing inputs to an application corresponding to the notification source. The inputs may trigger the notification at the notification source. The inputs may be, for instance an email, a message, a request, or other user-generated inputs which may trigger a notification at a recipient's client device. The notification server may receive the notification from the notification source responsive to new or updated information corresponding to the application (e.g., news, updates, etc.). In each of these embodiments, the notification server may receive a notification from a notification source.

At step 504, the notification server determines whether the notification is to be tagged. The notification server may apply a tagging policy by a tagging engine to determine whether the notification is to be tagged. The tagging policy may be configured/configurable by a user of the client device or an administrator, to determine particular conditions for tagging a notification, and/or to determine the content or type of tag to use (e.g., in order to control or manage the notification at the client device). In some embodiments, the notification server may tag notifications from a subset of notification sources. The subset may include notification sources corresponding to particular types of applications (e.g., only tag notifications received from notification sources that may include personal information, correspond to social media, or do not have a legitimate business purpose, for instance). The tagging policy may specify tagging of notifications from particular notification sources based on attributes or characteristics associated with the user, for example a user's position within a company or enterprise. The tagging policy, in such instances, may tag notifications from a given application (or application type) for some employees and while forgoing tagging for other employees. As an example, the tagging engine may apply an invisible tag to conceal the tag for notifications corresponding to social media applications for all employees except for those employees who work in marketing for the company. In some embodiments, the notification server may tag each of the device-level notifications received by the notification server.

At step 506, and in some embodiments, where the device-level notification is to be tagged, the notification server applies a policy to identify a context. The policy may be configured/configurable by a user of the client device or an administrator, to determine, detect or identify particular conditions and/or characteristics associated with (or giving rise to) the notification, that form (or can be categorized into) a context. Application of the policy can determine, identify and/or select a context (from a plurality of possible or predefined contexts) for the device-level notification. Application of the policy can perform a determination of the content or type of tag to use, according to the context (e.g., in order to control or manage the notification at the client device).

For example and in some embodiments, a policy engine of the notification server identifies a context of the device-level notification. The policy engine of the notification server may identify the context based on data included in the device-level notification from the notification source. The policy engine may identify the context based on data (e.g. metadata, analytics, activity log, endpoint analysis/detection data) received from the client device and/or other sources. Hence, the context may include contextual information corresponding to the client device, other sources and/or information from the device-level notification itself. In some embodiments, the policy engine may identify the context based on the time of day, day of the week, location, etc., in which the device-level notification is sent and/or received (e.g., to determine whether the notification is requested during work/office hours, weekend or off-work hours, when a target individual is out-of-office, etc., so as to configure the tag to control or manage the notification at the client device). In some embodiments, the policy engine may identify the context based on the source of the device-level notification (e.g., the notification source which transmitted the device-level notification to the notification server), the information about the application to receive the notification, and/or content of the notification. The source of the notification, application to receive the notification, and content may each be included in the device-level notification (e.g., in the header and/or body field of the notification). The policy engine may parse the device-level notification (e.g., header and/or body field) to extract the data used for identifying the context of the device-level notification. The policy engine may parse the data received from the client device for identifying the context of the device-level notification.

At step 508, the notification server adds a tag to the device-level notification. In some embodiments, the policy engine of the notification server adds a tag to the device-level notification according to the identified context. The tag may control rendering of the device-level notification (or a corresponding application-level notification) at a notification service of the client device. The tag may trigger performance of various functions by the notification service. The policy engine may apply one or more of a number of tags to the device-level notification. For instance, the policy engine may apply an emphasis tag, a follow-up tag, a priority tag, a conceal tag, etc. Some tags may be invisible tags (or visible tags). The policy engine may apply these tags based on the determined context (e.g., determined at step 506). In some implementations, the policy engine may apply these tags based on the determined context and data corresponding to the user. Each user may have preferences and/or policies for tagging device-level notifications associated therewith. The preferences and/or policies may be specified at a user level (e.g., personal preferences) department, company, and/or industry level (e.g., company preferences or policies), etc. The preferences/policies may be stored in association with various contexts and respective. Each of these tags may trigger a respective function or action by the notification service. In some embodiments, some of the respective functions or actions may overlap. In some embodiments, the tag may trigger one or more actions by the notification server.

As one example, a notification containing personal information (based on the context of the notification determined at step 506) may be tagged with an invisible tag. The invisible tag may trigger concealing the personal information from the notification (e.g. by the notification service and/or notification server), or trigger replacement of content for the notification. As another example, a device-level notification containing distracting information (based on the device-level notification being generated by friends, corresponding to a social media account, etc.) may be tagged with a conceal tag. The conceal tag may trigger concealing of the distracting information. As yet another example, a device-level notification soliciting feedback (based on the device-level notification including content requesting an answer, input, etc.) may be tagged with a follow-up tag. The follow-up tag may trigger monitoring user's actions on the client device with respect to the device-level and/or application-level notification to determine whether the feedback was provided. As still another example, a device-level notification may be assigned a priority based on the identified context. The device-level notification may be tagged with a priority tag indicating a respective priority of the device-level notification. The notification service may render the notification (e.g., device-level notification and/or application-level notification) in accordance with the priority (e.g., render the notifications in order of priority, only render high priority notifications, and so forth).

In some embodiments, the tag may identify an application of the client device to a notification service of the client device. The tag may identify which application of the client device is to trigger rendering of the application-level notification at the notification service. The tag may indicate a target application associated with the application that corresponds to the notification source. For instance, where the notification source is an email exchange server hosting an email application, the target application may be an email application on the client device. The tag may indicate a workspace application. The workspace application may be separate from the target application. The workspace application may be agnostic to the application which triggered generation of the notification at the notification source. Both the workspace application and the target application may be configured to push application-level notifications to the notification service of the client device for rendering. The tag may select which application is to push the application-level notification to the notification service for rendering.

In some embodiments, the tag may cause modification of at least a portion of the device-level or application-level notification. Continuing the examples above, a device-level notification tagged with an conceal tag may cause obfuscating the personal information from the device-level and/or application-level notification (e.g., by modifying the text such that the text becomes illegible, covering a portion of the notification, changing a color of the text to match a background color, etc.). As another example, a device-level notification including content which is specific to the user (e.g., based on the user being specifically addressed) may be tagged with an emphasis tag. The emphasis tag may trigger modification of the text or content specific to the user to draw the user's attention to the content. The emphasis tag may trigger increase in font size, change in font color, highlighting, etc. In some embodiments, the notification server may modify the device-level notification prior to transmitting the device-level notification to the client device (e.g., at step 514 described below). In some embodiments, the client device may generate the application-level notification following receipt of the device-level notification with the tag in accordance with the tag (e.g., at step 516).

At step 510, where the device-level notification is not to be tagged, the notification server determines whether to push the device-level notification to the client device. The notification server may determine whether to push the device-level notification to the client device based on the context of the device-level notification. The notification server may determine whether to push the device-level notification to the client device based on the priority of the device-level notification. The notification server may determine whether to push the device-level notification to the client device based on information included in the device-level notification. The notification server may determine whether to push the device-level notification to the client device based on contextual information of the client device. In some embodiments, the notification server may delay transmission of the device-level notification to the client device (e.g., at step 512) based on the priority of the device-level notification (e.g., delay low priority notifications), information included in the device-level notification (e.g., notifications corresponding to social media applications), contextual information (e.g., outside working hours), etc. The notification server may delay transmission of the device-level notification for a time interval (e.g., a number of seconds or minutes following transmission of a previous notification), responsive to receiving an indication from the client device indicating receipt of a previous notification, etc.

At step 514, the notification server may transmit the device-level notification to the client device. In some embodiments, the notification server may transmit the device-level notification with the tag to the notification service of the client device. By having the notification server parse the notifications received from the notification sources and apply tags thereto, the client device may not use as much processing power for parsing the notifications (as information is already provided to the client device by the notification server through the tags). As such, processing power of the client device may be reduced. Further, the client device may be configured to parse the tags faster than the notifications, thus increasing processing speed.

The notification server may transmit a plurality of device-level notifications in series based on priority of the respective device-level notifications. For instance, the notification server may transmit a first device-level notification having a higher priority than a second device-level notification (which is delayed). The notification server may transmit the second device-level notification when the notification server receives an indication of receipt of (or rendering of) the first device-level notification by the notification service. In some embodiments, the notification server may transmit a plurality of device-level notifications together, with each device-level notification being tagged with their respective priority tags. The notification service may render the device-level notifications in accordance with their respective priority.

At step 516, the client device manages the device-level notification based on the tag. In some embodiments, notification service of the client device may manage the device-level notification at the client device in accordance with the tag. In some embodiments, the client device establishes a workspace to present the device-level notification(s) (and/or application-level notifications based on the device-level notifications) transmitted by the notification server in accordance the respective tags. The workspace may present the notification(s) in accordance with the priority specified, included, or otherwise indicated in the respective tags for the notification.

Figure 6:
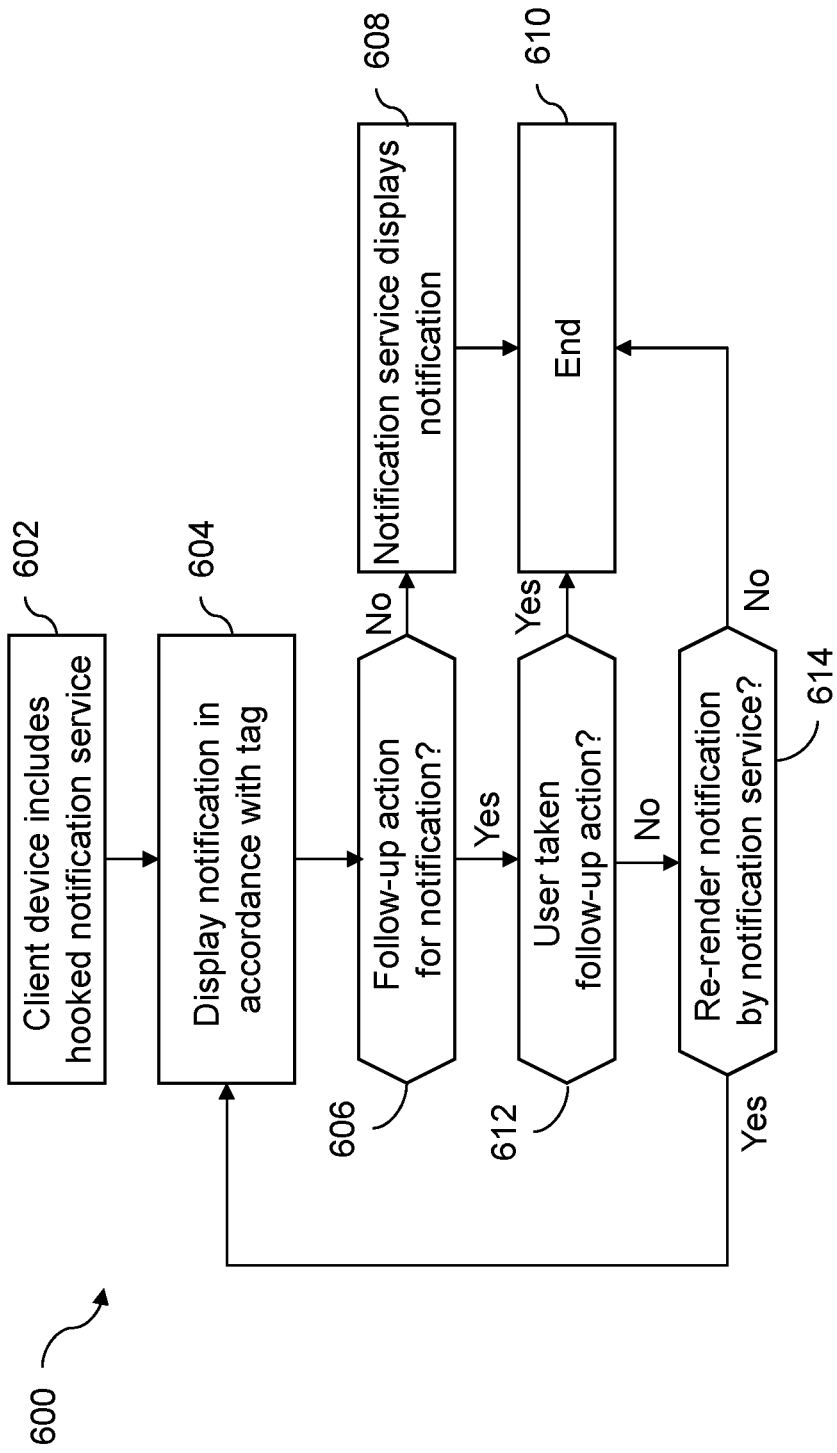
FIG. 6 is a flow diagram for another method for managing delivery of notifications.

Referring now to FIG. 6, depicted is a flow diagram for a method 600 for managing notifications. The functionalities of method 600 may be implemented using, or performed by, the components described in FIGS. 1-4, such as the client device(s) 202. In brief overview, at step 602, the client device includes a hooked notification service. At step 604, the client device renders the notification in accordance with the tag. At step 606, the notification service determines whether follow-up action for the notification is needed. At step 608, where no follow-up action is needed for the notification, the notification service renders the notification and, at step 610, the method 600 ends. At step 612, when follow-up action is need, the notification service determines whether the user has taken a follow-up action. At step 614, when the user has not taken a follow-up action, notification service determines whether or not to re-render the notification.

At step 602, the client device includes a hooked notification service. Hence, the notification service may include a hook including code executable on the client device. The hook may transmit messages to various applications of the client device. In some embodiments, hook may establish, generate, or otherwise provide an application (e.g., a workspace application) for the client device. The hook of the notification service may communicate at least a portion of the notification to the workspace application and/or to a local application (e.g., the target application) for generating application-level notifications. The notification service may render device-level notifications received from sources external to the client device, and may render application-level notifications from sources internal to the client device. As described above in reference to step 508 of FIG. 5, the target application may be associated with the application that corresponds to the notification source. The workspace application may be separate from the target application. The workspace application may be agnostic to the application which triggered generation of the device-level notification at the notification source. Both the workspace application and the target application (e.g., a native application) may be configured to push application-level notifications to the notification service of the client device for rendering. The notification service may thus communicate with both the target application and the workspace application (among other components, elements, and/or services of the client device).

At step 604, the client device renders the notification in accordance with the tag. In some embodiments, the notification service of the client device renders the device-level notification in accordance with the tag. The server may cause the notification service of the client device to render the device-level notification in accordance with the tag. The notification service may render the device-level notification responsive to receiving the device-level notification from the notification server. In some embodiments, an application of the client device may cause the notification service of the client device to render an application-level notification generated by the application based on the device-level notification and in accordance with the tag. In some embodiments, the notification service may delay rendering the notification based on the tag for notification. The notification service may render the notification (e.g., device-level and/or application level notification) following the delay. In some embodiments, the notification service may render the notification based on the priority of the notification as indicated in the tag (e.g., priority tag). The notification service may establish a workflow for notifications received at the client device (e.g., from the notification service and/or from the applications). The workflow may prioritize display of notifications based on the context of the notification (e.g., identified at step 506 of FIG. 5). In some embodiments, the workflow may receive a group of notifications (e.g., from an application and/or from the notification service). Each notification in the group may have a corresponding priority. The workflow may control the order in which the notifications are presented, and thereby delaying the display of a subset of notifications in some instances. The workflow may render, provide, or otherwise display notifications in the order of their priority (e.g., higher priority notifications displayed before lower priority notifications).

In some embodiments, the notification service may generate a modified notification (e.g., a device-level notification) based on the notification received from the notification server and/or tags applied to the notification by the notification server. The notification sever may generate the device-level notification by changing one or more aspects/features/characteristics of the notification in accordance with the tag(s), generating a new notification using data from the notification and the tag(s), and so forth. The device-level notification may include content from the notification received from the notification server. In some embodiments, the tags may correspond to modification of one or more aspects of the device-level notification. For instance, the tag may be a conceal tag for concealing personal information included in the notification. The notification service may generate the device-level notification to conceal portions of the notification (e.g., by redacting the personal information, removing the personal information, etc.).

In some embodiments, the notification service may transmit at least a portion of the device-level notification (e.g., received at step 514 of FIG. 5) to one of the applications. The notification service may transmit the portion of the device-level notification to the application indicated in or otherwise selected in a tag for the device-level notification. The application may be the workspace application and/or the target application. The application may generate and transmit application-level notifications based on the portion of the device-level notification received from the notification service. In some embodiments, the application(s) may trigger subsequent or additional application-level notifications by the notification service based on the device-level notification received at step 514.

At step 606, the application determines whether follow-up action for the application-level notification is needed. The follow-up action may be feedback from the user on the client device based on the application-level notification. The follow-up action may be a response to the application-level notification by the user on the client device based on the application-level notification. The application-level notification may indicate whether follow-up action is needed. For instance, at least one of the tags added (e.g., at step 508) may be a follow-up tag. The follow-up tag may indicate that one or more actions of the user are needed. The follow-up tag may be added based on the context of the device-level notification (e.g., requesting information, input or a response of the user, for instance). At step 608, where no follow-up action is needed for the notification, the notification service renders the notification and, at step 610, the method 600 ends.

At step 612, when follow-up action is need, the application (e.g., the workspace application) of the client device determines whether the user has taken a follow-up action. In some embodiments, the workspace application may monitor the client device to detect or identify an action of the user of the client device in response to the notification service rendering the application-level notification at the client device. The server may cause the client device to monitor for the action. The user may provide a follow-up action by selecting a button or providing an input on the application-level notification, launching the application (e.g., workspace application or native application), bringing the workspace application from the background to the foreground, etc.

At step 614, when the user has not taken a follow-up action, the application determines whether to re-render the application-level notification. In some embodiments, the tag may specify that the device-level notification is urgent. For instance, one of the tag(s) for a device-level notification may be an urgent tag. The urgent tag may direct the client device to re-push (e.g., via the workspace application to the notification service) and/or to re-render the application-level notification to ensure that the application-level notification does not go stale. The workspace application may monitor a duration of inactivity by the user on the application-level notification. The workspace application may monitor a duration of inactivity by the user on the client device. Where the duration exceeds a threshold (e.g., a number of seconds, minutes, and so forth), the workspace application may determine to re-push and/or re-render the application-level notification. In some embodiments, the workspace application may determine to re-render the application-level notification as an application-level notification for the workspace application or as an application-level notification for the target application. Hence, the workspace application may retrieve, access, or otherwise identify notification body of the application-level (or original device-level) notification. The workspace application may share the notification body with the target application. In such embodiments, the workspace application may trigger generation of an application-level notification at the target application. The workspace application may share content from the notification with the target application. The target application may generate an application-level notification based on the data received from the workspace application (e.g., rather than from a notification source or the notification server). The target application may push the generated application-level notification to the notification service of the client device for rendering. In either embodiment, the workspace application and/or target application may push the application-level notification to the notification service. The notification service may, in turn, re-render the application-level notification.

In some embodiments, the client device (e.g., via the notification service, workspace application or target application) may modify the notification responsive to determining to re-render the notification (e.g., based on a determination that there is an absence of activity or action at the client device following a prior rendered notification). For example, the notification service, workspace application or target application may modify the notification to increase, add or escalate an urgency and/or importance of the notification. As such, where the client device determines that the follow-up action has yet to be taken by the user, the notification service may increase, add or escalate the importance and/or urgency when re-pushing and/or re-rendering the notification on the client end.

In some implementations, the notification server and/or the notification source (e.g., WhatsApp® server) may determine (e.g., based on communication with the client device) that there is an absence of activity or action at the client device following a prior rendered notification. The notification server and/or the notification source (e.g., in a server or network cloud) may re-push the notification to the notification service. The notification server and/or the notification source may re-push the notification with an escalated importance and/or urgency to the notification service. The notification server may re-push the notification with a new or updated tag to the notification service. The notification server may modify one or more tags applied to the notification (e.g., the tags applied at step 508). The notification server may modify the tag(s) to increase the priority, urgency and/or importance of the tag(s), and so forth. The notification server may push the notification with the modified tags to the notification service. The notification service may re-render the notification in accordance with the modified tags. In these embodiments, the notification service may re-render the notification with an increased urgency, importance, etc., to reflect (or in response to) the absence or lack of follow-up action(s) from the user.

In some implementations, responsive to detecting that there is an absence of activity or action at the client device following a prior rendered notification, the notification server and/or notification source may push an alert (e.g., a notification with an escalated importance and/or urgency, or a notification with a modified tag), directed to a different client application (e.g., on the same client device), or to a different client device (e.g., a second client device). For instance, the notification server may push the alert to the different client device associated with the user such that a plurality of notifications may be rendered on a plurality of client devices for the user. As such, the likelihood of the user noticing the notifications may be increased.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.).

The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for managing notifications, the method comprising:
   receiving, by a server in communication with a client device, a notification from at least one notification source;
   identifying, by a policy engine of the server, a context of the notification;
   adding, by the policy engine according to the identified context, a tag to the notification to control rendering of the notification at the client device; and
   transmitting, by the server to the client device, the notification with the tag to render the notification on a screen of the client device, the client device including a hook comprising code executable to transmit a message to an application of the client device according to the tag of the notification, and the message being configured to cause display of the notification at the client device in accordance with the tag.

2. The method of claim 1, wherein identifying the context of the notification comprises identifying at least one of: a source of the notification, time information, a location of the client device, information about an application to receive the notification, information about a network connection of the client device, or information about a user of the client device.

3. The method of claim 1, further comprising identifying, to the notification service via the tag, the application of the client device.

4. The method of claim 1, wherein adding the tag to the notification comprises modifying at least a portion of the notification.

5. The method of claim 1, further comprising determining, by the policy engine according to the context of the notification, to add the tag to the notification as a visible or an invisible tag.

6. The method of claim 5, further comprising causing, in accordance with the invisible tag, at least some text in the notification to be obfuscated to a user of the client device when rendered on the screen at the client device.

7. The method of claim 1, further comprising causing the notification service to monitor for an action of a user of the client device in response to the notification service rendering the notification at the client device.

8. The method of claim 1, wherein the message is configured to cause the application to monitor for an action from a user of the client device responsive to the rendered notification, and to transmit a second notification to the notification service to render on the screen in response to an absence of the action from the user within a predetermined duration.

9. A method comprising:
   receiving, by a server in communication with a client device, a notification from at least one notification source;
   identifying, by the server, a context of the received notification, the context being indicative of a priority for display of the received notification on the client device;
   adding, by the server, a tag to the notification to control display of the received notification on the client device, the tag configured to indicate to the client device the priority for display of the received notification based on the identified context; and
   providing, by the server, the notification with the tag to the client device to establish a workflow for notifications received at the client device, the workflow prioritizes display of the received notifications at the client device based on the tags of the received notifications, the client device rendering the notification on a screen of an application of the client device, and the client device including a hook comprising code executable to transmit a message to the application of the client device according to the tag of the notification, the message being configured to cause display of the notification at the client device in accordance with the tag.

10. The method of claim 9, wherein identifying the context of the notification comprises identifying at least one of: a source of the notification, time information, a location of the client device, information about an application to receive the notification, information about a network connection of the client device, or information about a user of the client device.

11. A computing device for managing notifications, the computing device comprising:
   at least one processor configured to:
      receive a notification from at least one notification source, the notification for rendering on a screen at a client device;
      identify a context of the notification;
      add, according to the identified context, a tag to the notification to control rendering of the notification at the client device; and
      transmit,to the client device, the notification with the tag to render the notification on a screen of the client device, the client device including a hook comprising code executable to transmit a message to an application of the client device according to the tag of the notification, and the message being configured to cause display of the notification at the client device in accordance with the tag.

12. The computing device of claim 11, wherein the at least one processor is configured to identify the context of the notification by identifying at least one of: a source of the notification, time information, a location of the client device, information about an application to receive the notification, information about a network connection of the client device, or information about a user of the client device.

13. The computing device of claim 11, wherein the at least one processor is configured to identify to the notification service via the tag, an application of the client device.

14. The computing device of claim 11, wherein the at least one processor is further configured to determine, according to the context of the notification, to add the tag to the notification as a visible or an invisible tag.

15. The computing device of claim 14, wherein the at least one processor is further configured to cause, in accordance with the invisible tag, at least some text in the notification to be obfuscated to a user of the client device when rendered on the screen at the client device.

16. The computing device of claim 11, wherein the at least one processor is further configured to cause the notification service to monitor for an action of a user of the client device in response to the notification service rendering the notification at the client device.

17. The computing device of claim 11, wherein the message is configured to cause the application to monitor for an action from a user of the client device responsive to the rendered notification, and to transmit a second notification to the notification service to render on the screen in response to the absence of the action from the user within a predetermined duration.

* * * * *